(12) United States Patent
Gassmann et al.

(10) Patent No.: US 12,420,783 B2
(45) Date of Patent: Sep. 23, 2025

(54) ANALYZING IN-VEHICLE SAFETY BASED ON A DIGITAL TWIN

(71) Applicant: Intel Corporation, Santa Clara, CA (US)

(72) Inventors: Bernd Gassmann, Straubenhardt (DE); Kay-Ulrich Scholl, Malsch (DE); Frederik Pasch, Karlsruhe (DE); Cornelius Buerkle, Karlsruhe (DE); Fabian Oboril, Karlsruhe (DE)

(73) Assignee: Intel Corporation, Santa Clara, CA (US)

( * ) Notice: Subject to any disclaimer, the term of this patent is extended or adjusted under 35 U.S.C. 154(b) by 808 days.

(21) Appl. No.: 17/520,809

(22) Filed: Nov. 8, 2021

(65) Prior Publication Data

US 2022/0055620 A1  Feb. 24, 2022

(51) Int. Cl.
B60W 30/095 (2012.01)
B60W 40/09 (2012.01)
G06V 20/59 (2022.01)

(52) U.S. Cl.
CPC ........ B60W 30/0956 (2013.01); B60W 40/09 (2013.01); G06V 20/59 (2022.01); B60W 2420/408 (2024.01)

(58) Field of Classification Search
None
See application file for complete search history.

(56) References Cited

U.S. PATENT DOCUMENTS

2008/0306996 A1* 12/2008 McClellan ............. G06Q 10/06
2017/0351268 A1* 12/2017 Anderson ............ G07C 5/0825
2018/0012089 A1* 1/2018 Ricci ..................... B60K 35/80
2018/0257683 A1* 9/2018 Govindappa ........... B61L 27/57
2019/0279008 A1* 9/2019 Abhau ..................... G06T 7/70
2019/0303729 A1* 10/2019 Gramenos ............ G06V 20/593
2019/0375312 A1* 12/2019 Petersson .......... B60R 21/01554
(Continued)

FOREIGN PATENT DOCUMENTS

DE       102017202222 A1 * 10/2017 ........... B60N 2/0276
DE       102020102053 A1 *  7/2021
WO    WO-2017196226 A1 * 11/2017 ............. B60K 28/08

OTHER PUBLICATIONS

Machine translation of DE-102020102053-A1 (Year: 2025).*
Machine translation of DE-102017202222-A1 (Year: 2025).*

Primary Examiner — Aniss Chad
Assistant Examiner — Jennifer M Anda
(74) Attorney, Agent, or Firm — Viering, Jentschura & Partner mbB

(57) ABSTRACT

Disclosed herein are systems, devices, and methods of a safety system for monitoring the in-vehicle safety of internal objects within a vehicle. The safety system generates a digital twin of the interior objects from vehicle configuration data indicating a configuration of an interior environment of the vehicle, from interior object data associated with the interior object within the interior environment of the vehicle, and from vehicle situation data that indicates an operating status of the vehicle. The digital twin is an abstract model of the interior objects within the interior environment of the vehicle, and the safety system generates, based on the digital twin, a safety score associated with an operating behavior of the vehicle. Based on the safety score, the safety system determines a target level for the operating behavior.

18 Claims, 7 Drawing Sheets

(56) References Cited

U.S. PATENT DOCUMENTS

| | | | | |
|---|---|---|---|---|
| 2020/0164771 A1* | 5/2020 | Unnervik | ............ | B60N 2/42745 |
| 2021/0107496 A1* | 4/2021 | Oboril | ............... | B60W 60/0013 |
| 2021/0272394 A1* | 9/2021 | Cella | ................. | G06Q 30/0207 |
| 2021/0397164 A1* | 12/2021 | Thomas | ................... | G06F 30/15 |

* cited by examiner

ANALYZING IN-VEHICLE SAFETY BASED ON A DIGITAL TWIN

TECHNICAL FIELD

The disclosure relates generally to vehicle safety, and in particular, to systems, devices, and methods that relate to the in-vehicle safety of interior objects within a vehicle.

BACKGROUND

Vehicles with autonomous or partially autonomous driving modes are becoming increasingly prevalent. Such vehicles typically include a variety of monitoring systems that are equipped with a variety of cameras and other sensors to observe information about the safety situation of the vehicle with respect to other traffic participants and unexpected objects that may be approaching the vehicle. For example, the vehicle may scan for approaching objects outside the vehicle, and provide safe operating behaviors (e.g., driving behaviors) for the vehicle in respect of the detected objects and/or other traffic participants. Such safety monitoring systems, however, do not consider what safety considerations may be necessary for protecting the safety of objects within the vehicle. As a result, a human driver (e.g., one of the responsible passengers) must ensure that all objects (such as luggage, passengers, pets., etc.) remain safe and secured during the trip.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
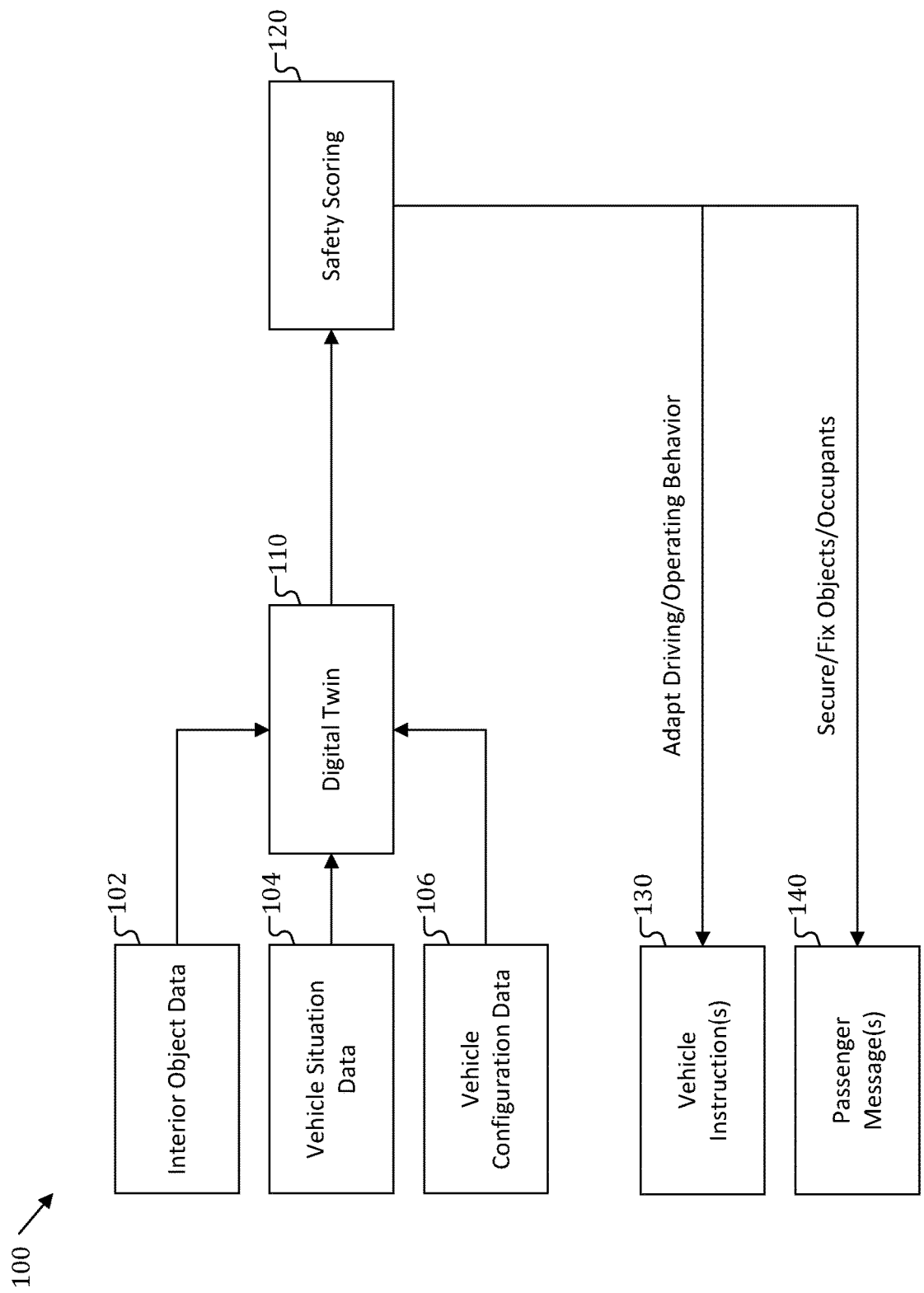
FIG. 1 shows an exemplary safety system for analyzing and improving the in-vehicle safety of internal objects within a vehicle.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc., where "[ . . . ]" means that such a series may continue to any higher number). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc., where "[ . . . ]" means that such a series may continue to any higher number).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, or a rocket, among others. As used herein, an interior object should be understood as an object inside the vehicle (e.g., in the interior cabin, in the trunk, in a truck bed, in a luggage rack, in a luggage compartment, in a vehicle's trailer, etc.), which can be generally moved in, out, or around the vehicle's spaces, such as a driver, passengers, pets, bags/luggage, groceries, cargo loads, sports equipment, etc. As should be understood from these examples, the interior object may be in an external space of the vehicle (e.g., in the truck bed, in an attached trailer, attached to the rooftop), and the term "internal object" is used to distinguish it from other traffic participates and to indicate an object that generally moves with the vehicle from the perspective of the other traffic participants.

The apparatuses and methods described herein may be implemented using a hierarchical architecture, e.g., by introducing a hierarchical prioritization of usage for different types of users (e.g., low/medium/high priority, etc.), based on a prioritized access to the spectrum (e.g., with highest priority given to tier-1 users, followed by tier-2, then tier-3, etc.).

Many of today's vehicles are equipped with safety monitoring systems or automated driving systems that may use safety-defined driving behaviors or assist a driver to use safe driving behaviors for safely operating the vehicle and for safely reacting to changed road conditions, the appearance of unexpected objects, etc. However, these systems evaluate driving behaviors from the external perspective of the vehicle (e.g., the vehicle vis-a-vis the road, other traffic participants, and other external objects), and not from the internal safety perspective (i.e., how the safety of interior objects, including, for example, the passengers or luggage), which may be adversely impacted by the driving behaviors of the vehicle. As examples, an unbuckled passenger may be in danger of flying out of the seat and risking injury if the vehicle were to suddenly brake; a briefcase stowed in an open luggage rack on a bus may fly off the rack and injure a passenger if the bus takes too sharp of a turn; or load in a truck bed may topple into the road if the truck runs over a large pothole. In each of these situations, the operational/driving behavior may have an impact on interior objects and their in-vehicle safety.

In conventional systems, the in-vehicle safety is generally the driver's responsibility or each individual passenger's responsibility, where the driver and/or passengers must ensure that interior objects (including themselves) are safely secured and/or appropriately positioned to be ready for any possible type of driving behavior (e.g., accelerations, sharp, turns, fast braking events, etc.) that may adversely impact the safety of the interior objects. In addition, given that the status of interior objects may also change while driving (i.e., a passenger may move positions, remove a safety belt, place their arms/head outside the window, etc.), the driver may need to react accordingly by slowing down, stopping, instructing a passenger to sit down, etc. For example, the driver may need to continuously monitor that passengers remain seated, have their safety belt fastened, and do not place their head/arms out of the window.

In conventional systems, the vehicle's or driver's operating behaviors are not individually tailored to the actual situation of the interior objects within the vehicle, but rather, are general safety parameters (e.g., a maximum speed, a minimum turning radius, a maximum acceleration, etc.) that are applied irrespective of the individual situation of the interior objects. This is likely due to the limited availability of on-vehicle processing resources, which are consumed by other safety systems, such as external monitoring and processing of data associated with the vehicle safety, and there may not be sufficient on-vehicle resources for the monitoring and processing of in-cabin data. In addition, remote processing of in-cabin data is undesirable because monitoring and processing of in-cabin data at an off-vehicle location may create privacy issues associated with the personal information that may be captured by the in-cabin data collection.

As should be apparent from the detailed disclosure below, the disclosed in-vehicle safety system solves these problems by creating an abstract digital model of the interior of the vehicle (e.g., a "digital twin"), that removes privacy-related information from the collected in-cabin data. This allows a representation of the relevant in-cabin data to be transferred away from the vehicle in a way that does not implicate privacy issues. Using the digital twin, the in-vehicle safety considerations may be processed remote from the vehicle (e.g., on a remote server (e.g., on the cloud)). Such a system may avoid overburdening the in-vehicle processing capabilities and allows for privacy-protected processing of in-vehicle data at a location remote from the vehicle. As a result, the safety system may detect in-cabin safety issues based on the digital twin, and the safety system may alert the vehicle (or the operator of the vehicle) of in-cabin safety issues in a timely manner so that the vehicle and/or its operator may take appropriate responsive actions to protect the safety of the interior objects.

Using acceleration as an exemplary operating behavior, the system may use the digital twin to determine an acceptable range of accelerations for reducing the risk of injuring a passenger or damaging interior objects. The vehicle may then use this acceptable range of accelerations in its automated driving system (ADS) and/or vehicle safety system (e.g., a responsibility-sensitive safety system) to adapt the nominal maximum acceleration ranges for the planning system (e.g., when stopping the vehicle for a red light or resuming it for a green light) and braking acceleration ranges for the vehicle safety system (e.g., when the vehicle encounters an unexpected traffic object/situation). In addition, the vehicle's warning system may provide warnings (e.g., safety-related warnings or comfort-related warnings) to drivers of the safety impacts (or comfort impacts) associated with the internal objects or a warning for passengers to sit-down, fasten their seat belt, remove their feet from the dashboard, or to secure their bags, their luggage, or their animals. While acceleration has been provided as an exemplary operating behavior, it should be appreciated that the digital twin may be used to assess the safety impact of any type of operating/driving behavior (e.g., acceleration, speed, jerk, turning/trajectory, braking, gear-shifting, etc.). In addition, any type of action or series of actions (e.g., vehicle instructions and/or passenger warnings/messages) may be provided to enforce the operating/driving behavior (e.g., if a warning does not improve the situation for the interior object, cause the vehicle to pull over and disable the vehicle until remedial action improves the situation for the interior object) in order to reduce the safety risk for interior objects.

FIG. 1 shows a safety system 100 for analyzing and improving the in-vehicle safety of an internal object or objects of a vehicle using a digital twin and reacting accordingly. Safety system 100 may obtain interior object data 102 for one or more interior objects associated with the vehicle. As noted earlier, the interior objects may include any object inside the vehicle (e.g., in the cabin, in the trunk, in a truck bed, on a luggage rack, in a luggage compartment, etc.), which can be generally moved in, out, and about the vehicle, such as a driver, passengers, pets, bags/luggage, groceries, cargo loads, sports equipment, etc. The interior object data 102 may be collected by one or more sensors that are directed to the interior portion or portions of the vehicle.

The collected interior object data 102 may include an array of information about each interior object, including each object's basic attributes/properties such as a unique object identifier, a position of the object within the vehicle, a size of the object, an orientation of the object within the vehicle, an outline of the object (e.g., a bounding box), a shape category (e.g., a rough shape (e.g., a person-shaped object, a rectangular-shaped object, a sphere-shaped object)), a weight of the object (e.g., an estimated weight), an object classification (e.g., a person, an animal, a general object, etc.), and/or a subclassification (e.g., for a person, subclass may be age-based (e.g., infant, child, teen, young-adult, elderly person, etc.) and/or risk-based (e.g., pregnant, handicapped, undersized, oversized), etc.; for an animal, subclass may be type-based (e.g., dog, cat, bird, etc.); for other objects, the subclass may be object type-based (e.g., sports equipment objects, luggage objects, grocery objects, plant objects, bottled drink objects, smartphone objects, laptop objects, bicycle objects, ski objects, etc.).

Depending on the classification or subclassification, the interior object data 102 may include additional types of information that may be relevant to the in-cabin safety of the interior object under various operating behaviors of the vehicle. For persons, for example, additional data might include a basic kinematic model of the body (e.g., head, arms, legs, etc.), the estimated age of the person, special safety risks associated with the person (e.g., pregnancy, injured, handicapped, other vulnerabilities), and/or data related to any factors that may be relevant to the in-cabin safety of the person (e.g., is the person sitting, standing, etc.; is the person in a wheelchair or car seat; is the person attentive to the movement of the vehicle or distracted, etc.).

The interior object data 102 may also include safety-related attributes for each interior object, including, for example, whether the person has properly attached a safety restraint (e.g., wearing a seat belt), the person is holding a support handle (e.g., while standing on a bus/tram), or whether an object has been secured by straps (e.g., for luggage on a luggage rack or a cargo load in the bed of a truck). Safety system 100 may abstract the array of collected interior object data 102 for each interior object to remove personal and/or identifying information that may be included as part of the digital twin 110.

In addition to interior object data 102, safety system 100 may also obtain vehicle configuration data 106 that may describe the interior areas/compartments of the vehicle (e.g., the current configuration of the interior). The vehicle configuration data 106 may include a unique vehicle identifier, a vehicle model, a vehicle type, a vehicle variant, the seat configuration, the storage area configuration (e.g., the available space and locations associated with a truck bed, a luggage rack, a luggage compartment, etc.). The vehicle configuration data 106 may include static and variable information about the vehicle. Static vehicle configuration data 106 may include, for example, the seat types, seat sizes, the available safety belts/straps and/or support handles, the size of the cabin and storage areas, the user-configurable options (e.g., adjustable seats, adjustable belts, adjustable windows, adjustable cargo areas, etc.), the location of cup holders, the location of airbags, the location of windows, etc. Such static vehicle configuration data 106 may be obtained, for example, from a database of static information associated with the model, type, and/or variant.

Variable vehicle configuration data 106 may include, for example, user-configurable options related to the interior spaces of the vehicle such as the configured position of each seat, the configured position of each window, the configured position of the cargo area (e.g., a luggage net, a cargo cover, etc.), whether a safety belt is engaged and locked in place, etc. Given that the variable vehicle configuration data 106 may change during the course of a trip, the safety system 100 may monitor the vehicle configuration data 106 for changes, even while the vehicle is being driven. In this sense, safety system 100 may assess and re-assess the safety of the interior objects on a periodic or aperiodic basis (e.g., every millisecond, every few seconds, every minute, when the situation changes, etc.). As with the interior object data 102, safety system 100 may abstract the array of collected vehicle configuration data 106 to remove personal and/or identifying information that may be included as part of the digital twin 110.

In addition to interior object data 102 and vehicle configuration data 106, safety system 100 may also obtain vehicle situation data 104 that may describe the driving environment and/or external situation of the vehicle. Safety system 100 may gather such information from sensors on the vehicle, sensors directed to the environment outside the vehicle, and/or data received from the vehicle's communications (e.g., vehicle-to-anything (V2X) communications) with external traffic participants/objects. For autonomous vehicles, partially autonomous vehicles (e.g., a driver-assisted vehicle), or vehicles with advanced safety systems, the vehicle's other systems (e.g., autonomous driving system, driver-assist system, and/or other safety systems) may have already recorded or made available the relevant vehicle situation data 104.

Vehicle situation data 104 may include, for example, the geographic location of the vehicle, the position/pose of the vehicle, the location of the vehicle in relation to a map location, the speed, the acceleration, the target speed, the target acceleration, the planned or expected route of the vehicle, the weather conditions, the road conditions (e.g., the type of surface and/or whether there are bumps, potholes, wet areas, icy areas, etc.), the road geometry (e.g., the curvature, the incline, the decline, the width, etc.), the current traffic situation, the status of other traffic participants/objects that may be proximate to or approaching the vehicle, etc. As with the interior object data 102 and vehicle configuration data 106, safety system 100 may abstract any of the vehicle situation data 104 to remove personal and/or identifying information that may be included as part of the digital twin 110.

Once safety system 100 has generated the digital twin 110, safety system 100 may provide the digital twin 110 to a safety scoring module 120 (e.g., a safety scoring generator). The safety scoring module may be on the vehicle or it may be remote from the vehicle (e.g., on a remote server (e.g., in the cloud)). The safety scoring module 120 may use the digital twin 110 to calculate safety scores associated with various operating behaviors of the vehicle. For example, the safety scoring module 120 may evaluate the digital twin 110 against possible operating behaviors that may occur as the vehicle moves along its route. For example, the vehicle may maintain its current speed, the vehicle may accelerate slowly, the vehicle may accelerate quickly, the vehicle may decelerate slowly, or the vehicle may decelerate quickly. For each of these possible operating behaviors, the safety scoring module 120 may evaluate the likelihood that each possible operating behavior is to occur, evaluate the safety impact of an occurrence of each possible operating behavior to the object or objects in the vehicle, and then generate a safety score associated with each possible operating behavior.

The safety scoring module 120 may then send generated safety scores to the vehicle for adapting the operating behavior and/or for generating warnings relevant to the safety of the interior objects. For example, the safety scoring module 120 may send the generated safety scores to a vehicle instruction module 130 and/or a passenger message module 140. The vehicle instruction module 130, for example, may use the received safety scores for parameterizing the automated driving system or the driver-assist system with nominal values (e.g. a range of values or threshold values) associated with the operating behavior, in order to adapt the operating behavior to conform to a value (e.g., restrict operation of the vehicle to a target level) that is suitable for the interior objects. As should be appreciated, the vehicle instruction module 130 may provide parameters associated with the scored operating behavior to or may be part of the automated driving system (ADS) and/or vehicle safety system (e.g., a responsibility-sensitive safety system).

The passenger message module 140, for example, may generate warnings for the driver and/or passengers related to the interior objects and their scored operating behaviors. For example, the passenger message module 140 may flash a warning light, provide a message on a screen, and/or provide an audible message indicating that a safety risk exists for a particular interior object and/or that a particular object should be secured, repositioned, or otherwise adjusted to reduce the risk of injuring a passenger and/or damaging the object. As should be appreciated, the passenger message module 140 may provide warnings to or be part of the automated driving system (ADS) and/or vehicle safety system (e.g., a responsibility-sensitive safety system).

Figure 2:
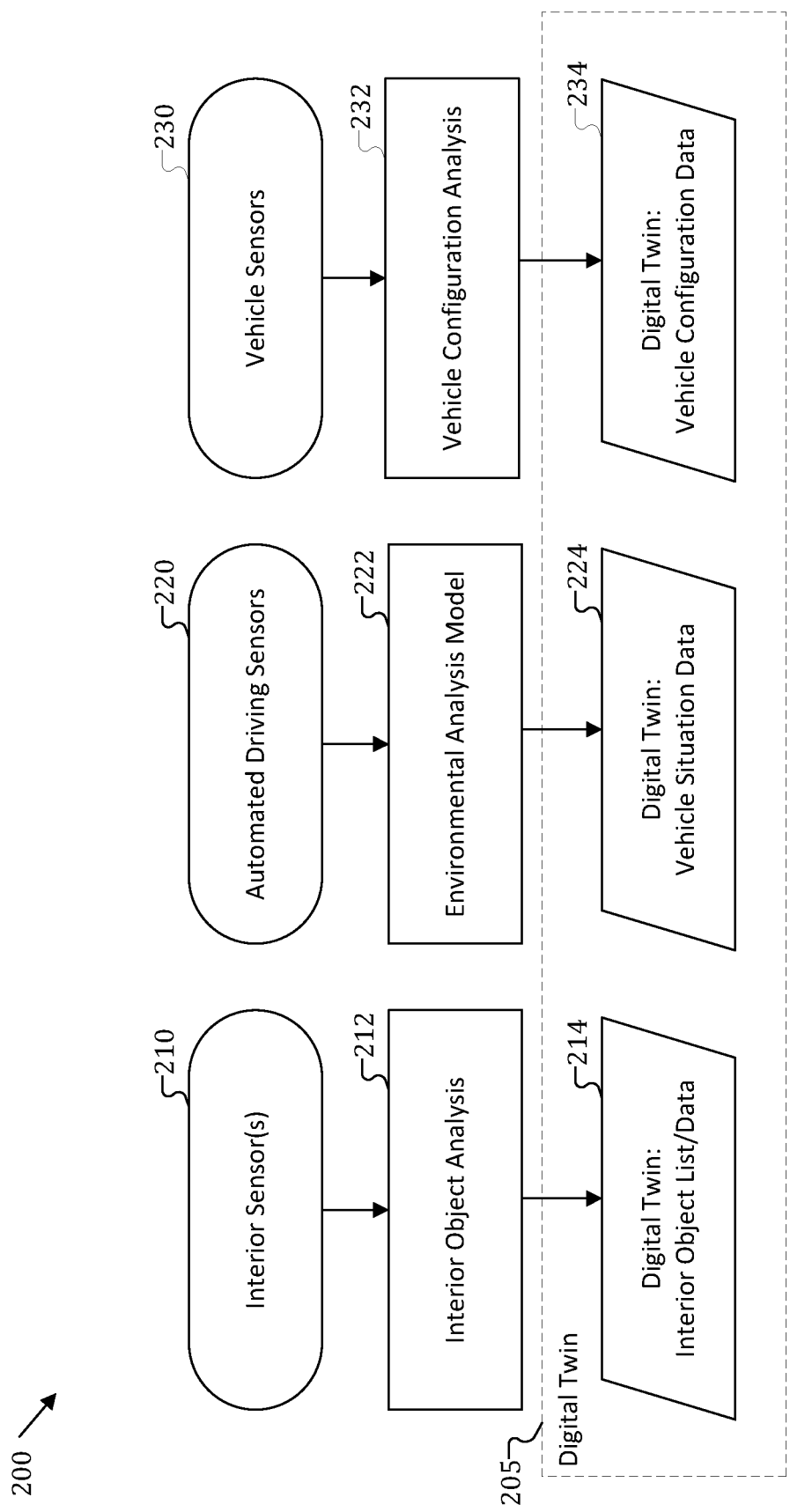
FIG. 2 shows a block diagram for creating digital twin data within a vehicle.

FIG. 2 shows a safety system 200 (e.g. safety system 100 or a part thereof) that may create a digital twin 205 in a vehicle and what data may be included with the digital twin 205. It should be appreciated that FIG. 2 is merely exemplary, and this example implementation is not intended to limit safety system 100, which may be implemented in any number of ways. FIG. 2 shows, for example, that safety system 200 may direct an interior sensor or sensors 210 to the interior portion or portions of the vehicle for collecting interior object data. Such interior sensors 210 may include, for example, cameras, Light Detection and Ranging (LiDAR) sensors, depth sensors, event-based cameras (e.g., neuromorphic cameras), pressure sensors, radar sensors, etc. that are configured to collect data about objects within the interior portions of the vehicle.

Safety system 200 may analyze this collected internal object data in an object analysis module 212 that may perform object detection, object tracking, object fusion, object classification, and other types of object analysis. Safety system 200 may abstract the results from the object analysis module 212 to remove personal and/or identifying information that may have been collected by the interior sensors 210 and then safety system 200 may, in module 214, use the abstracted internal object data to create for the digital twin 205 a list of the interior object list and the relevant data associated with each object, which may include, for example, as discussed above with respect to FIG. 1, any of the interior objected data 102 the safety system 100 may provide to the digital twin 110.

In addition to interior sensors 210, the safety system 200 may include an automated driving sensor or sensors 220 directed to the driving environment and/or external areas of the vehicle for collecting vehicle situation data. Such automated driving sensors 220 may include, for example, cameras, Light Detection and Ranging (LiDAR) sensors, depth sensors, radar sensors, accelerometers, gyroscopes, inertial measurement units (IMUs), global positioning system (GPS) sensors, etc. that are configured to collect data about the vehicle, other traffic participants, external objects, and other aspects of the environment proximate to the vehicle or along the vehicle's expected and/or planned route. The automated driving sensors 220 may also receive such data from the vehicle's communications (e.g., using vehicle-to-anything (V2X), WiFi, Bluetooth, cellular, and/or ANT+ communications systems) with external traffic participants/objects.

An environmental analysis module 222 may analyze this collected situational data to perform external object detection, external object tracking, external object fusion, external object classification, environmental analysis, and other types of environmental/object analysis of the environment, external objects, and/or other traffic participants near the vehicle in order to enhance the data. Safety system 200 may abstract the results from environmental analysis module 222 to remove personal and/or identifying information that the automated driving sensors 220 may have collected, and then safety system 200 may use the abstracted environmental analysis data, in module 224, to create for the digital twin 205 the relevant vehicle situation data associated with the environment of the vehicle, which may include, for example, as discussed above with respect to FIG. 1, any of the vehicle situation data 104 that safety system 100 may have provided to digital twin 110.

In addition to interior sensors 210 and automated driving sensors 220, the safety system 200 may include a vehicle sensor or sensors 230 directed to detecting and identifying the interior configuration of the vehicle. Such vehicle sensors 230 may include, for example, cameras, Light Detection and Ranging (LiDAR) sensors, depth sensors, radar sensors, databases, etc. that are configured to provide data about the interior spaces of the vehicle. The vehicle sensors 230 may be or be connected to databases that contain vehicle information for a given vehicle model, type, and variant, and this data may also be received from the vehicle's communications (e.g., using vehicle-to-anything (V2X), WiFi, Bluetooth, cellular, and/or ANT+ communications systems) with external data sources.

Safety system 200 may analyze this collected configuration data in a vehicle configuration analysis module 232 that may provide detailed information about the interior spaces of the vehicle, extracted from the collected configuration data. Safety system 200 may abstract the results from vehicle configuration analysis module 232 to remove personal and/or identifying information that the vehicle sensors 230 may have collected, and then safety system 200 may, in module 234, create for the digital twin 205 the relevant vehicle configuration data for the interior spaces of the vehicle, which may include, for example, as discussed above with respect to FIG. 1, any of the vehicle configuration data 106 that safety system 100 may have provided to digital twin 110.

Figure 3:
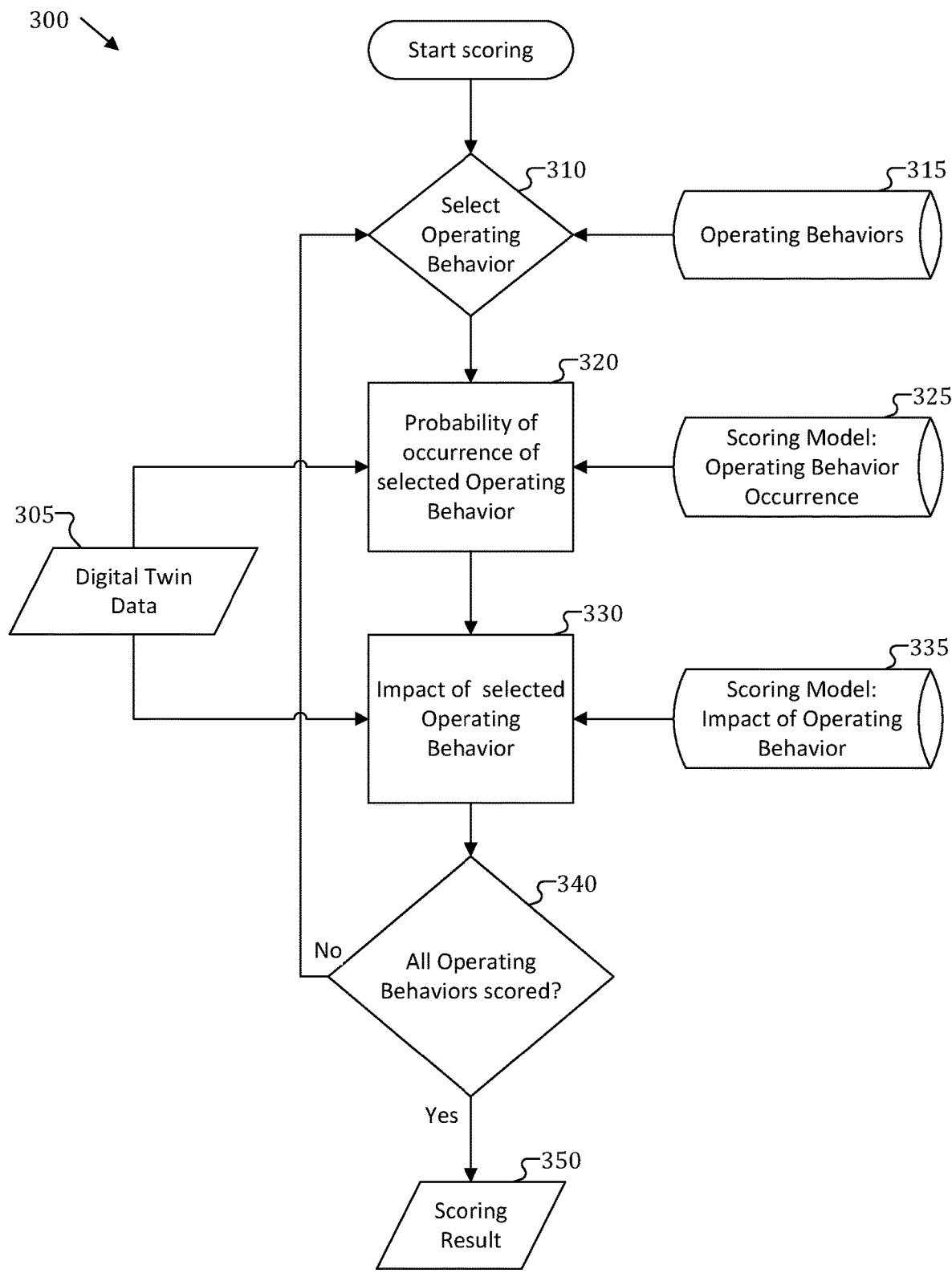
FIG. 3 depicts an exemplary flow diagram for a safety scoring module.

FIG. 3 shows an exemplary flow diagram for a safety scoring module 300 (e.g., a safety scoring generator). Safety scoring module 300 may be an exemplary implementation (or part of an implementation) of safety scoring module 120 of safety system 100 described above with respect to FIG. 1. The flow diagram shows the process for safety scoring the interior objects contained in the digital twin (e.g., digital twin 110 and/or digital twin 205). It should be appreciated that safety scoring module 300 is merely exemplary, and this example is not intended to limit safety system 100 or safety scoring module 120, which may be implemented in any number of ways.

In order to start the scoring process for the interior objects, the safety scoring module 300 may select, in module 310, an operating behavior that is to be scored. The scoring module 300 may select the operating behavior from a set of pre-determined operating behaviors 315. The set of pre-determined operating behaviors 315 may include pre-determined values for any type and/or combination of operating/driving behaviors (e.g., acceleration, speed, jerk, turning/trajectory, braking, gear-shifting, etc.). Using acceleration as an example, the set of predetermined operating behaviors 315 may be maintaining a current speed, accelerating slowly, accelerating quickly, decelerating slowly, or decelerating quickly. Using speed as an example, the set of predetermined operating behaviors 315 may be driving at the speed limit, driving above the speed limit, driving below the speed limit, driving at 150 miles per hour, driving at 20 miles per hour, etc.

Once the safety scoring module 300 selects an operating behavior, the selected operating behavior may be evaluated, in 320, to determine a probability that the selected operating behavior will occur. To determine the probability of occurrence, the safety scoring module 300 may use any of the received digital twin data 305. The digital twin data 305 may include the data in digital twin 110, described above with respect to FIG. 1 and/or the data (214, 224, and 234) in the digital twin 205 described above with respect to FIG. 2. In particular, the vehicle situational data (e.g., vehicle situation data 224 of FIG. 2 or the vehicle situation 104 stored in digital twin 110 of FIG. 1), which may contain the current operational/driving state of the vehicle with respect to its current operating environment and the vehicle's expected or planned route, may be particularly useful for this determination.

For example, the safety scoring module 300 may determine from the vehicle situational data that the vehicle is traveling with a moderate speed and approaching a traffic light that is about to turn red. In such a circumstance, for the selected operating behavior of maintaining-the-current-speed, safety scoring module 300 may determine it to have a low probability of occurrence, whereas for the selected operating behavior of decelerating-quickly, safety scoring module 300 may determine it to have a high probability of occurrence. As another example, the safety scoring module 300 may determine from the vehicle situational data that the vehicle is traveling at the current speed limit on a rough road and is approaching an area that has a higher speed limit and a smoother road. In such a circumstance, for the selected operating behavior of decelerating-quickly, the safety scoring module 300 may determine it to have a very low probability of occurrence, whereas for the selected operating behavior of accelerating-slowly, the safety scoring module 300 may determine it to have a high probability of occurrence.

The safety scoring module 300 may determine a probability based on a scoring model of occurrence data 325 related to operating behaviors. The scoring model of occurrence data 325 may be a pre-trained artificial intelligence model and/or a physical-based model that associates occurrence probabilities with various attributes of vehicle situation data, which safety scoring module 300 may then compare to corresponding vehicle situation data in the digital twin data 305 to arrive at a probability of occurrence. The safety scoring module 300 may store the scoring model of occurrence data 325 locally (e.g., within the safety scoring module 300) and/or safety scoring module 300 may receive the scoring model of occurrence data 325 from a scoring model database.

Next, the safety scoring module 300 may, in module 330, evaluate the safety impact of the selected operating behavior on the interior objects of the digital twin to determine a safety score (e.g. criticality level) for each operating behavior. To determine the safety score, the safety scoring module 300 may use any of the received digital twin data 305. The digital twin data 305 may include the data in digital twin 110, described above with respect to FIG. 1 and/or the data (214, 224, and 234) in the digital twin 205 described above with respect to FIG. 2. In particular, the vehicle configuration data (e.g., vehicle configuration data 234 of FIG. 2 or the vehicle configuration data 106 stored in digital twin 110 of FIG. 1), which may contain the configuration of the interior space of the vehicle, may be particularly useful for this determination. In addition, safety scoring module 300 may use the interior object data (e.g., interior object list/data 214 of FIG. 2 or the interior objected data 102 stored in digital twin 110 of FIG. 1) to assess the risk level of each interior object based on its status with respect to the current configuration of the vehicle's interior. The safety scoring module 300 may use this data to simulate (e.g., spawn simulated interior objects using a simulator to generate simulated scoring data) how the interior objects may react to the selected driving behavior and how their safety may be impacted in order to generate a safety score for the operating behavior.

For example, the safety scoring module 300 may determine for the selected operating behavior of decelerating-quickly that a small child firmly secured in a child seat may score a low risk of injury whereas a small pet that is not held by a passenger may score a high risk of injury associated with the same operating behavior. In addition, safety scoring module 300 may weight the safety score by the class of object or its transitional state (e.g., the object sliding, the object falling, the object breaking, the object impacting other objects, the object is a person). For example, safety scoring module 300 may determine a lower level of risk for an object merely sliding around in a luggage compartment as compared to a higher level of risk for the object falling out of a luggage rack into the main compartment of a crowded bus and impacting other passengers. Thus, the safety scoring module 300 may associated each potential transitional state for the object with a particular risk level, the aggregate of which the safety scoring module 300 may use to determine the safety score for each object for the selected operating behavior.

The safety scoring module 300 may determine the safety score based on a scoring model of risk data 335 related to operating behaviors. The scoring model of risk data 335 may be a pre-trained artificial intelligence model and/or a physical-based model that associates risks with various attributes of the internal object data and/or transitional states of the internal object, which the safety scoring module 300 may then compare to corresponding vehicle situation data in the digital twin data 305 to arrive at a risk for the selected operating behavior for each object of the digital twin data 305. The safety scoring module 300 may store the scoring model of risk data 335 locally (e.g., within the safety scoring module 300) and/or the safety scoring module 300 may receive the scoring model of risk data 335 from a scoring model database.

Next, in module 340, safety scoring module 300 determines whether it has scored all of the relevant operating behaviors. If not, the safety scoring module 300 returns to module 310 to select the next operating behavior to score and proceeds as described above with respect to modules 320 and 330. If safety scoring module 300 determines it has scored all of the relevant operating behaviors, the safety scoring module 300 proceeds to module 350 to generate an overall scoring result based on the safety scores for each of the evaluated objects according to each of the evaluated operating behaviors. The scoring result may include an acceptable nominal value (e.g., a value, range of values, a target level, and/or a range of target levels) for any of the operating behaviors described above. For example, the scoring result may include an acceptable range of nominal acceleration values (e.g., a target level of acceleration) and an acceptable range of nominal speed values (e.g., a target level of speed) for the vehicle. In addition, the safety scoring module 300 may include with the scoring result, a list (e.g., a data record) of detailed scoring results, organized by each evaluated interior object. The detailed scoring results in the listing may include, for example, an object identifier and, for each operating behavior, an identifier for the operating behavior, the probability of occurrence of the operating behavior, a safety score, and the risk level for each of the possible transitional states associated with the safety score.

Figure 4:
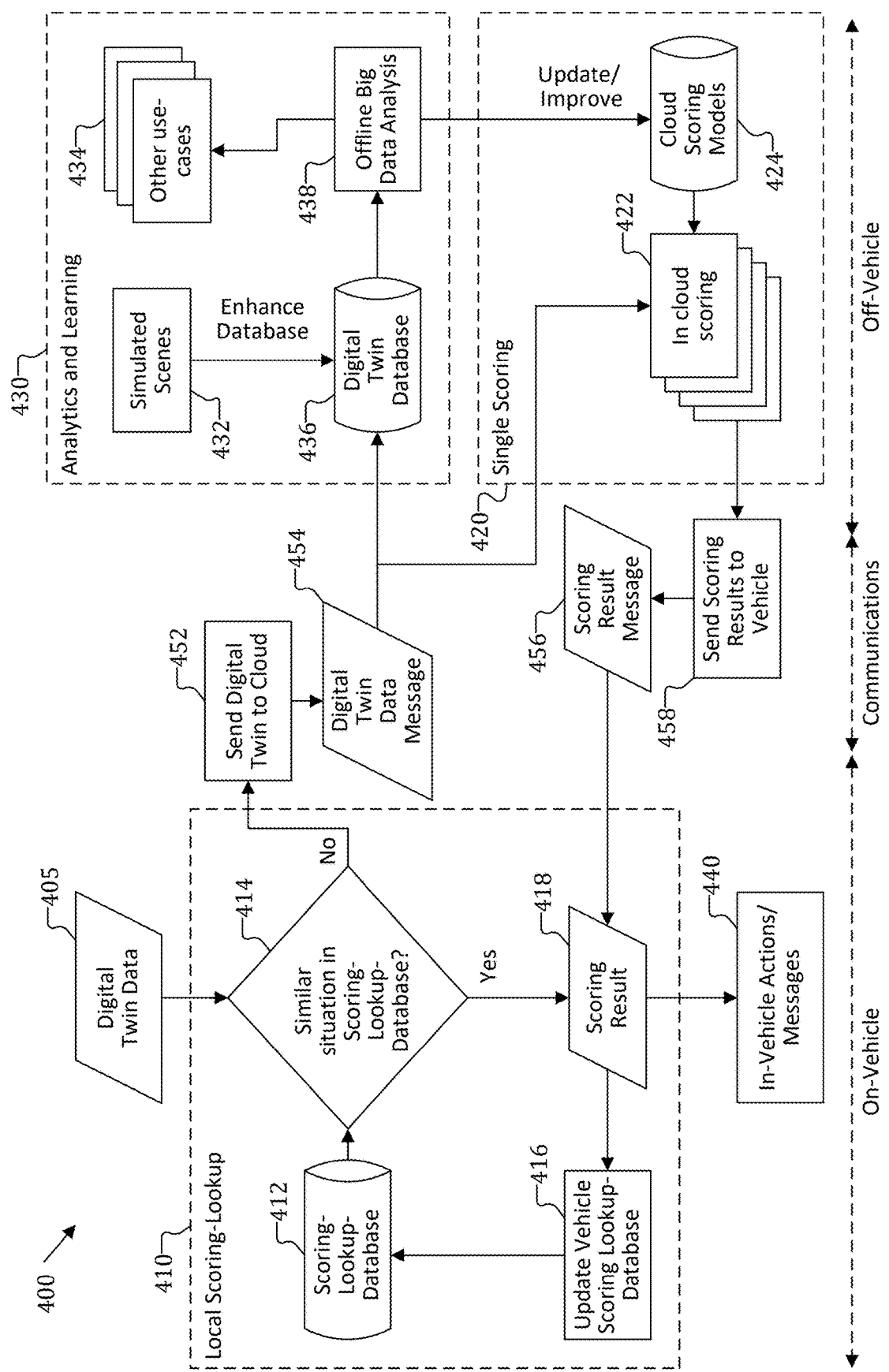
FIG. 4 depicts an exemplary flow diagram of a safety system for the in-vehicle safety of internal object(s)

FIG. 4 shows an exemplary flow diagram for a safety system 400. Safety system 400 may be an exemplary implementation (or part of an implementation) of safety system 100 described above with respect to FIG. 1. It should be appreciated that safety system 400 is merely exemplary, and this example is not intended to limit safety system 100, which may be implemented in any number of ways.

Safety system 400 may include a local scoring-lookup module 410 that may be implemented within the vehicle. As noted earlier, while digital twin data (e.g., digital twin data 405) may be sent to a remote server for processing in order to preserve on-vehicle computational resources for other tasks, remote communications to a server may not always be available, efficient, and/or desired. As such, safety system 400 may use the local scoring-lookup module 410 to generate a safety score for the digital twin data 405. It should be appreciated that digital twin data 405 may include the data in digital twin 110, described above with respect to FIG. 1 and/or the data (214, 224, and 234) in the digital twin 205 described above with respect to FIG. 2. The local scoring-lookup module 410 may include a scoring lookup database 412 that contains scoring results that have been previously-calculated or pre-populated for various combinations of interior object data values, vehicle situation data values, and/or vehicle configuration data values.

The local scoring-lookup module 410 may, in module 414, compare the digital twin data 405 with the values in the scoring lookup database 412 to see if there is a sufficient match (i.e., within a certain tolerance of matching values between the values in the scoring lookup database 412 and the digital twin data 405). If there is a sufficient match, the local scoring-lookup module 410 may select, in 418, the matching scoring result value from database 412 as the safety score, and pass this safety score on to module 440 to generate instructions for appropriate in-vehicle actions and/or in-vehicle warning messages. As should be appreciated, the generated instructions may be, for example, any of the vehicle instructions 130 and/or passenger messages 140 described above with respect to FIG. 1. By utilizing the local scoring-lookup module 410, safety system 400 may reduce its reliance on the remote server and reduce communication overhead and computational costs. In addition, if there are no viable communications with the remote server, the local scoring lookup module 410 may be able to provide some level of safety scoring, even when the remote server cannot be contacted.

The scoring lookup database 412 may be realized by a pretrained artificial intelligence model, which safety system 400 may update, in 416, based on the scoring result 418. Of course, the scoring result 418, when obtained from the scoring lookup database 412, may be associated with a scoring uncertainty for the given digital twin data 405, due to, for example, insufficient data in the scoring lookup database 412 and/or an insufficient match. If the uncertainty is too high, the local scoring lookup module 410 may discard the scoring result and instead force the safety system 400 to perform a single safety scoring (e.g., use single scoring module 420) to obtain a safety score with lower uncertainty.

If module 414 finds no sufficient match (or if the uncertainty is too high as explained in the prior paragraph), the local scoring-lookup module 410 may determine, in 452, to transmit the digital twin data 405 to a remote server (e.g., off vehicle) with a request to generate a safety score for the digital twin data 405. Safety system 400 may communicate the digital twin data 405 to the remote server via a digital twin data message 454. The digital twin data message 454 may include the digital twin data 405 (e.g., vehicle configuration data, vehicle situational data, an interior object listing, and/or interior object data) and other data associated with the digital twin data and/or scoring request, such as a scoring request identifier, a timestamp associated with the request, etc. In addition, because much of the digital twin data 405 may remain constant over time, safety system 400 may configure the digital twin data message 454 to transmit only the portions of the digital twin data 405 that have changed since the last transmission. In addition, safety system 400 may populate the digital twin data 405 with only the changed aspects of the interior object data, the vehicle situation data, and/or the vehicle configuration data, which data the safety system 400 may capture directly, for example, using event-based cameras (also called neuromorphic cameras).

The safety system 400 may send the digital twin data 405 to the remote server (e.g., in a digital twin data message 454) using a communications interface. The communication interface may include a transmitter that may operate according to any type of communications protocol, including, for example, V2X, WiFi, Bluetooth, cellular, and/or ANT+ communications protocols for transmitting the digital twin data 405 from the vehicle to the remote server. The safety system 400 may send the digital twin data 405 to an analytics and learning module 430 and/or a single scoring module 420.

The single scoring module 420 may generate a safety score for the received digital twin data 405 in a manner similar to that described above with respect to safety scoring module 300 of FIG. 3 to perform, in module 422, in-cloud safety scoring. Once the single scoring module 420 has generated a safety score, the safety score and associated data (e.g., the scoring result) may be communicated, in module 458, back to the vehicle. The safety system 400 may communicate the scoring result to the vehicle in a scoring result message 456. The scoring result message 456 may include, as discussed above with respect to FIG. 3, an acceptable nominal value (e.g., a value, range of values, a target level, and/or a range of target levels) for an operating behavior of the vehicle. In addition, the safety scoring result message 456 may include a list (e.g., a data record) of detailed scoring results, organized by each evaluated interior object. The detail scoring results in the listing may include, for example, an object identifier and, for each operating behavior, an identifier for the operating behavior, the probability of occurrence of the operating behavior, a safety score, and the risk level for each of the possible transitional states associated with the safety score.

As described for the safety scoring module 300 of FIG. 3, the single scoring module 420 of FIG. 4 may utilize cloud scoring models 424 (e.g., scoring model of occurrence data 325 and/or a scoring model of risk data 335) to generate scoring results. The analytics and learning module 430 may update and/or improve the scoring models 424 with updated/improved scoring analytics data.

The analytics and learning module 430 may, in module 438, use deep-learning, machine learning, simulation learning, and other types of known big data analytics in order to pre-populate, generate, update, and/or improve the scoring models 424 of single scoring module 420.

Of course, analytics and learning module 430 may provide the digital twin database 436 and big data analytics, in module 434, for other uses, including, for example, to government organizations or third-party vendors to evaluate the effectiveness/adoption of safety standards, to assess the quality/use of seatbelts/restraint systems, to statistically analyze interior objects (e.g., empty seats, number of passengers, number of passengers compared to capacity, the amount of luggage space under-, fully-, or over-utilized) for optimizing vehicle selection for a particular bus route at a particular time/day, and/or for other in-vehicle safety/comfort mechanisms and messages. For example, the digital twin database 436 may be used to determine the cleanliness of the vehicle, detect that a passenger has forgotten an object (e.g., luggage) unattended in a vehicle, and/or detect that the passengers are misusing or have misused the vehicle (e.g., the passengers are standing/jumping on the seats, dropping garbage, putting their head out of the windows, etc.).

Figure 5:
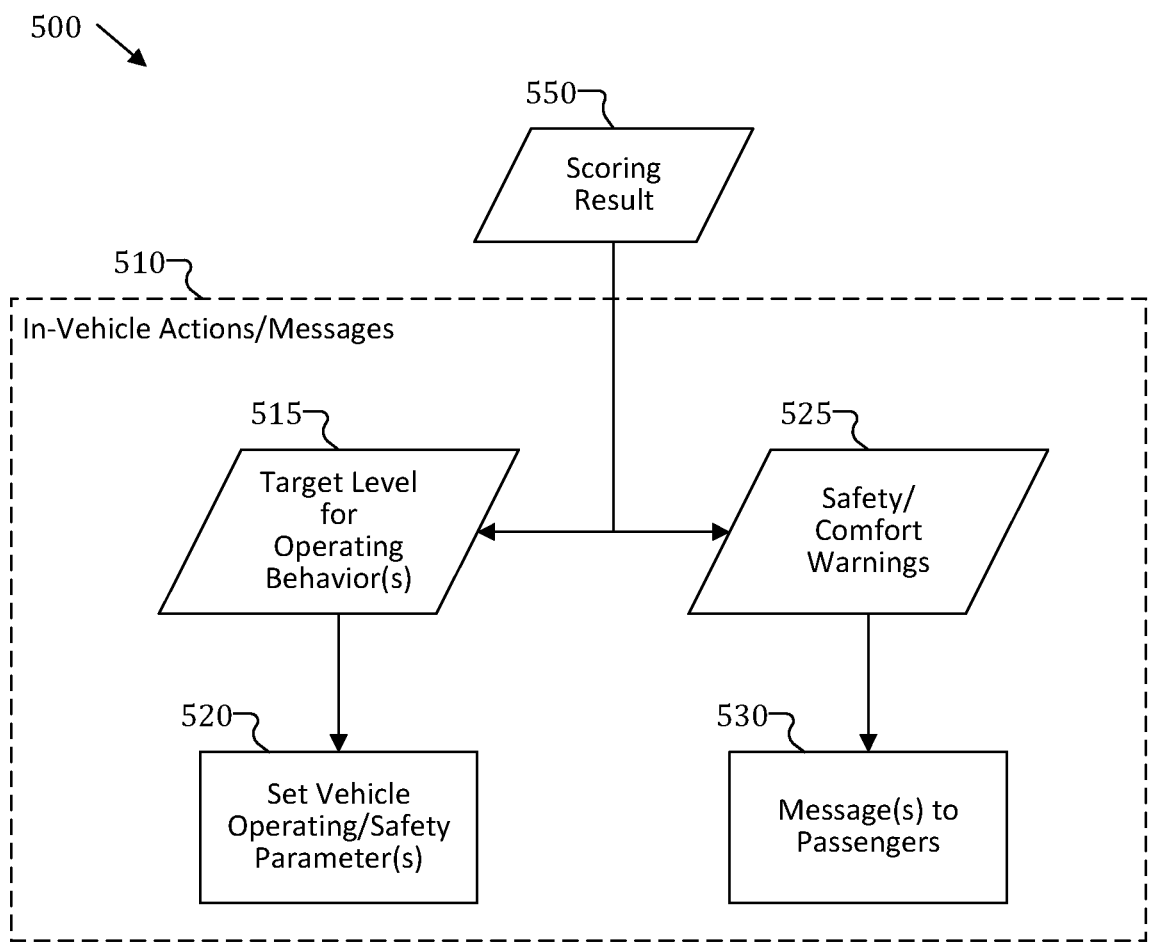
FIG. 5 shows an exemplary flow diagram of a safety system for the in-vehicle safety of internal object(s)

FIG. 5 shows an exemplary flow diagram for a safety system 500. Safety system 500 may be an exemplary implementation (or part of an implementation) of safety system 100 described above with respect to FIG. 1, safety system 200 described above with respect to FIG. 2, safety scoring module 300 described above with respect to FIG. 3, and/or safety system 400 described above with respect to FIG. 4. It should be appreciated that safety system 500 is merely exemplary, and this example is not intended to limit safety system 100, safety system 200, safety scoring module 300, or safety system 400, each of which may be implemented in any number of ways.

Safety system 500 may receive in module 550, a safety scoring result. Safety system 500 may generate the safety scoring result of module 550 as described above with respect to safety scoring module 120 of FIG. 1, scoring result module 350 of FIG. 3, and/or scoring result module 418 of FIG. 4. Safety system 500 may transmit the safety scoring result from module 550 to an in-vehicle actions/message module 510 for generating instruction and/or warnings relevant to the safety of the interior objects, which will be described in more detail below. The in-vehicle actions/messages module 510 may operate as described above with respect to vehicle instructions module 130 and passenger messages module 140 of FIG. 1 and/or in-vehicle actions/messages module 440 of FIG. 4.

For example, the in-vehicle actions/messages module 510 may, based on the scoring results from module 550, which may include, for example, a target value or range of target values for an operating behavior of the vehicle, generate an instruction/warning for the vehicle designed to adapt (either autonomously or by a human driver) the vehicle to operate at the target value or within the range of target values for the operating behavior. The in-vehicle actions/messages module 510 may extract (e.g., in module 515) and provide the target value or range of target values as one or more parameters to (e.g. in module 520) an automated driving system of the vehicle, which the automated driving system may use to conform the operation of the vehicle (e.g., restrict operation of the vehicle) to operate according to the target value or range of target values (e.g., extracted in module 515). The in-vehicle actions/messages module 510 may also provide the target value or range of target values (e.g., extracted in module 515) as one or more parameters to (e.g. in module 520) an additional safety system of the vehicle (e.g., a responsible-safety system), which the additional safety system may use to conform its safety decisions to the target value or range of target values (e.g., to increase the safety distance between the vehicle and other objects so that a lower deceleration may be used that is within the target range). By receiving this information, the additional safety system may be able to intervene earlier, in hopes of avoiding a situation where the safety-scored operating behavior exceeds the target threshold value.

The in-vehicle actions/messages module 510 may also generate a notification or warning (e.g., in module 525) designed to be provided (e.g., in module 530) to alert passengers (or a remote operator) about the safety risk or comfort warning associated with an interior object and the operating behavior. For example, if the vehicle determines (e.g., via a safety system) that a braking action is about to occur that may cause harm to an insufficiently secured object (e.g. the braking action will cause the vehicle to exceed the target threshold value for acceleration), the in-vehicle actions/messages module 510 may (e.g. in module 530) inform passengers with a warning light, a text message displayed on a vehicle's in-cabin screen, and/or an audible message. The message may indicate that a safety risk exists for a particular interior object and/or that the particular object should be secured, repositioned, or otherwise adjusted to reduce the risk of injuring a passenger and/or damaging the object. For example, if a truck with a load in the truck bed is approaching a rough road ahead and where the safety score indicates the load is likely to become unstable under any range of operating conditions, the in-vehicle actions/messages module 510 may generate a driving instruction for the truck to pull-over and a warning message indicating that the load should be better secured in the truck bed. As another example, if a bus with standing passengers is approaching a sharp turn such that the safety risk associated with a standing passenger may have changed, the in-vehicle actions/messages module 510 may generate a message indicating that the passengers should return to their seats and fasten their seat belts.

Further scenarios may also be helpful in demonstrating the disclosed safety systems and the exemplary in-vehicle actions/messages that may be provided by, for example, in-vehicle actions/messages module 510. In the case of an automated driving bus, assume that a standing passenger on the bus is an elderly person with a walking aid (e.g., a cane, a walker, etc.). The safety system 500 may, based on a digital twin that includes the standing passenger and the safety score associated with the standing passenger, determine threshold(s) for the operational behaviors of the bus, including, for example, a low range of acceleration values that minimize the risk that the acceleration would cause the standing passenger to fall. The safety system 500 may provide the determined low range of acceleration values to the automated driving system of the bus so that the bus conforms its acceleration to be within the determined low range of acceleration. In addition, safety system 500 may also generate a warning message for the passenger to sit down, which may be triggered proactively due to changes in the bus's environmental situation data (e.g., a new object has appeared or a traffic light is approaching that will necessitate fast braking).

In the case of an automated driving vehicle, assume for example that a passenger has a placed a cup of coffee on the dashboard of the vehicle rather than in the installed cup-holder. The safety system 500 may, based on the digital twin that includes the unsecured coffee cup and the safety score associated therewith, determine threshold(s) for the operational behaviors of the vehicle, including, for example, a low range of acceleration values that minimize the risk that the unsecured coffee cup topples over. The safety system 500 may provide the low range of acceleration values to the automated driving system of the vehicle to conform to the low range of acceleration. In addition, safety system 500 may provided a warning message to the passenger to stow the cup in the designated cup-holder. If the passenger moves the coffee cup to the designated holder, the safety system 500 may re-analyze the interior objects of the vehicle to determine a new safety score associated with the now-secured coffee cup, and then the safety system 500 may provide the newly calculated, higher acceleration values to the automated driving system.

In the case of automated driving truck, assume for example that the digital twin data shows that the load in the truck bed has shifted positions while the truck has been moving, and the safety system 500 has determined that the load now has a greater risk that it will topple over. In response to the new safety score, the safety system 500 may generate a driving instruction for the automated driving system to slow down, pull-over, and stop the truck until the load is repositioned and better-secured in truck bed.

In the case of automated driving bus, assume the bus is approaching a rough road segment known to cause turbulence for busses. The safety system 500 may determine from the digital twin data that luggage in the luggage rack has a safety score in the rough road segment that indicates a high risk that the luggage will drop down if the bus's speed exceeds a certain velocity level. In such a case, the safety system 500 may provide a maximum speed to the automated driving system so that the automated driving system conforms to a slower speed along rough road segment. In addition, the safety system 500 may warn the passengers to better secure the luggage.

Figure 6:
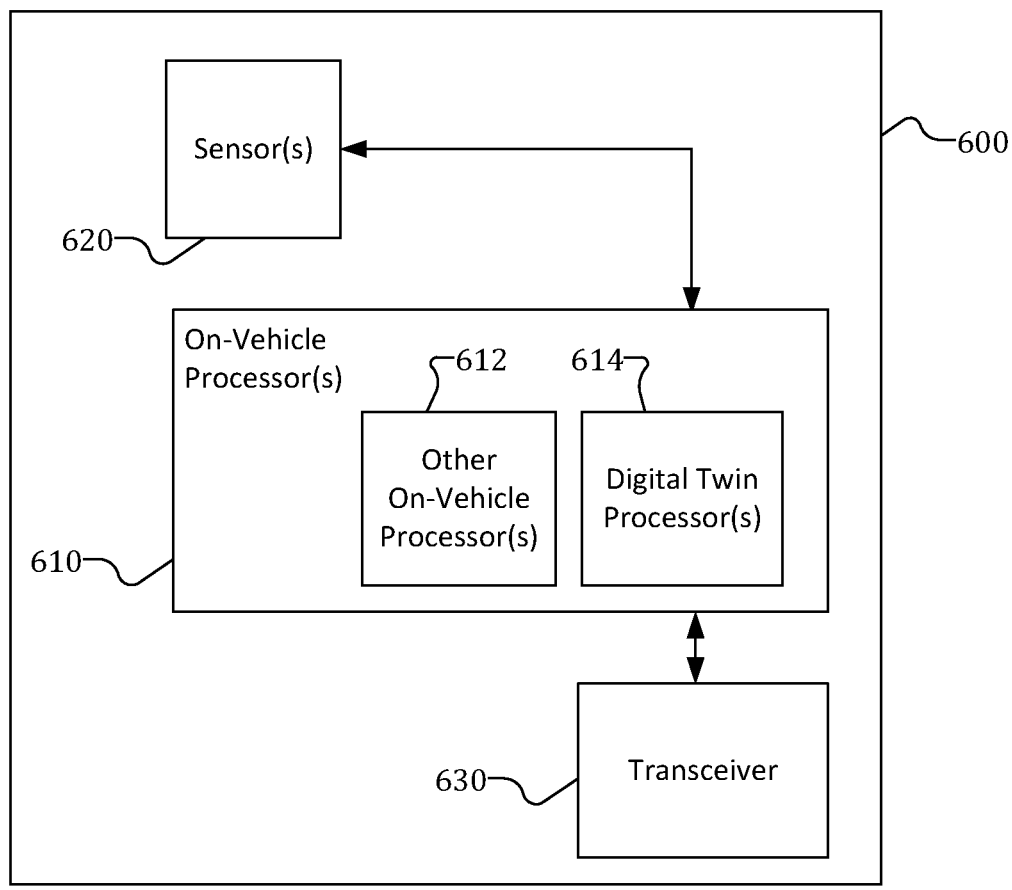
FIG. 6 illustrates a schematic drawing of an apparatus for the in-vehicle safety of internal object(s)

FIG. 6 is a schematic drawing illustrating an apparatus 600 for analyzing and improving the in-vehicle safety of internal objects of a vehicle using a digital twin. The apparatus 600 may include any of the safety system features described above with respect to, as examples, the safety system 100 of FIG. 1, safety system 200 of FIG. 2, safety scoring module 300 of FIG. 3, safety system 400 of FIG. 4, and/or safety system 500 of FIG. 5. FIG. 6 may be implemented as an apparatus, a method, and/or a computer readable medium that, when executed, performs the features of the safety systems described above. It should be understood that apparatus 600 is only an example, and other configurations may be possible that include, for example, different components or additional components.

Apparatus 600 includes a processor 610, which may be implemented in or distributed among one or more processing units, including, for example, digital twin processor(s) 614 and/or other vehicle processor(s) 612, that may be configured, individually or collectively, to implement any of the features of processor 610 described below. In addition or in combination with any of the features described in the following paragraphs, the processor 610 of apparatus 600 is configured to receive vehicle configuration data that indicates a configuration of an interior environment of a vehicle. Processor 610 is also configured to receive interior object data associated with an object within the interior environment of the vehicle. Processor 610 of apparatus 610 is also configured to receive vehicle situation data that indicates an operating status of the vehicle. Processor 610 is also configured to generate, based on the vehicle configuration data, the interior object data, and the vehicle situation data, a digital twin of the object, wherein the digital twin may include an abstract model of the object within the interior environment. As noted above, digital twin processor(s) 614 may be configured to generate the digital twin, although it could be configured in or distributed among other vehicle processor(s) 612 or any of the one or more processing units that may encompass processor 610. Processor 610 is also configured to receive a safety score for an operating behavior of the vehicle, wherein the safety score is based on the digital twin. Processor 610 is also configured to determine, based on the safety score, a target level for the operating behavior. As noted above, other on-vehicle processor(s) 612 may be configured to determine the target level, although it could be configured in or distributed among digital twin processor(s) 614 or any of the one or more processing units that may encompass processor 610.

Furthermore, in addition to or in combination with any one of the features of this and/or the preceding paragraph, apparatus 600 may include one or more sensor(s) 620 for receiving sensor data associated with the interior object data, vehicle configuration data, the interior object data, and/or the vehicle situation data. Furthermore, in addition to or in combination with any one of the features of this and/or the preceding paragraph, apparatus 600 may include a transceiver 630 for receiving the safety score and/or for transmitting the digital twin to a safety scoring generator. Furthermore, in addition to or in combination with any one of the features of this and/or the preceding paragraph with respect to apparatus 600, the operating behavior may include an acceleration of the vehicle, a jerk of the vehicle, a speed of the vehicle, and/or a trajectory of the vehicle. Furthermore, in addition to or in combination with any one of the features of this and/or the preceding paragraph with respect to apparatus 600, the processor 610 may be further configured to generate an instruction configured to conform operation of the vehicle to the target level for the operating behavior. Furthermore, in addition to or in combination with any one of the features of this and/or the preceding paragraph with respect to apparatus 600, the processor 610 may be further configured to generate a warning message if a current operating level for the operating behavior exceeds the target level. Furthermore, in addition to or in combination with any one of the features of this and/or the preceding paragraph with respect to apparatus 600, the processor 610 may be further configured to transmit (e.g., via transceiver 630) the digital twin to a safety scoring generator, wherein the processor configured to receive the safety score includes the processor configured to receive the safety score from the safety scoring generator (e.g., via transceiver 630). Furthermore, in addition to or in combination with any one of the features of this and/or the preceding paragraph with respect to apparatus 600, the processor 610 may be further configured to transmit (e.g., via transceiver 630) a subset of the digital twin to a safety scoring generator, wherein the subset includes data changes to the digital twin that are different from a previously-transmitted digital twin of the object.

Furthermore, in addition to or in combination with any one of the features of this and/or the preceding two paragraphs with respect to apparatus 600, the apparatus 600 may further include a transmitter (e.g., transceiver 630), wherein the processor configured to transmit the digital twin to the safety scoring generator includes the processor configured to transmit via the transmitter the digital twin to the safety scoring generator. Furthermore, in addition to or in combination with any one of the features of this and/or the preceding two paragraphs with respect to apparatus 600, the apparatus 600 may further include a receiver (e.g., transceiver 630), wherein the processor configured to receive the safety score from the safety scoring generator includes the processor configured to receive via the receiver the safety score from the safety scoring generator. Furthermore, in addition to or in combination with any one of the features of this and/or the preceding two paragraphs with respect to apparatus 600, the transmitter (e.g., transceiver 630) may include a wireless transmitter. Furthermore, in addition to or in combination with any one of the features of this and/or the preceding two paragraphs with respect to apparatus 600, the receiver (e.g., transceiver 630) may include a wireless receiver. Furthermore, in addition to or in combination with any one of the features of this and/or the preceding two paragraphs with respect to apparatus 600, the safety scoring generator may be located on a server that is remote from the vehicle.

Furthermore, in addition to or in combination with any one of the features of this and/or the preceding three paragraphs with respect to apparatus 600, the transmitter (e.g., transceiver 630) may be further configured to transmit the digital twin in a digital twin data message, wherein the digital twin data message may include a timestamp indicating a time at which the digital twin was created and/or last updated, the vehicle configuration data, the interior object data, and/or the vehicle situation data. Furthermore, in addition to or in combination with any one of the features of this and/or the preceding three paragraphs with respect to apparatus 600, the processor 610 may be further configured to generate a comfort message related to a status of the object in the vehicle. Furthermore, in addition to or in combination with any one of the features of this and/or the preceding three paragraphs with respect to apparatus 600, processor 610 may be further configured to identify the object from the interior object data. Furthermore, in addition to or in combination with any one of the features of this and/or the preceding three paragraphs with respect to apparatus 600, the apparatus 600 may further include a sensor (e.g., one or more sensor(s) 620) configured to collect the interior object data, wherein the sensor includes a camera, a LiDAR, or a radar directed to the interior environment of the vehicle.

Furthermore, in addition to or in combination with any one of the features of this and/or the preceding four paragraphs with respect to apparatus 600, the safety score may include a plurality of safety scores, wherein each safety score of the plurality of safety scores is based on the digital twin and is for a respective operating range of a plurality of operating ranges of the operating behavior. Furthermore, in addition to or in combination with any one of the features of this and/or the preceding four paragraphs with respect to apparatus 600, the safety score may be based on a probability that the vehicle will be operated at the target level of the operating behavior. Furthermore, in addition to or in combination with any one of the features of this and/or the preceding four paragraphs with respect to apparatus 600, the safety score may be based on a magnitude of a safety impact associated with operating the vehicle at the target level of the operating behavior. Furthermore, in addition to or in combination with any one of the features of this and/or the preceding four paragraphs with respect to apparatus 600, the safety scoring generator may include a lookup table containing a plurality of previously calculated safety scores for the digital twin, wherein each previously calculated safety score is associated with a previous configuration of the interior environment of the vehicle and a previous operating status of the vehicle, wherein the safety scoring generator is configured to select from the lookup table the safety score from the plurality of previously calculated safety scores based on matching the configuration to the previous configuration and matching the operating status to the previous operating status.

Furthermore, in addition to or in combination with any one of the features of this and/or the preceding five paragraphs with respect to apparatus 600, the safety score may be based on a scoring model of scoring data from a plurality of digital twins associated with other vehicles. Furthermore, in addition to or in combination with any one of the features of this and/or the preceding five paragraphs with respect to apparatus 600, the safety score may be based on a scoring model of simulated scoring data. Furthermore, in addition to or in combination with any one of the features of this and/or the preceding five paragraphs with respect to apparatus 600, the object may include a moveable object that is repositionable within the interior of the vehicle. Furthermore, in addition to or in combination with any one of the features of this and/or the preceding five paragraphs with respect to apparatus 600, the moveable object may include a driver, a passenger, an animal, a bag, a purse, a backpack, and/or a suitcase.

Furthermore, in addition to or in combination with any one of the features of this and/or the preceding six paragraphs with respect to apparatus 600, the vehicle configuration data may include a unique vehicle identifier, a vehicle model, a vehicle type, a vehicle variant, a seat configuration of the vehicle, a luggage rack configuration of the vehicle, and/or a cargo area configuration of the vehicle. Furthermore, in addition to or in combination with any one of the features of this and/or the preceding five paragraphs with respect to apparatus 600, the vehicle situation data may include a vehicle pose, a geographical location of the vehicle, a map location in relation to the geographical location, a speed of the vehicle, an acceleration of the vehicle, a target speed of the vehicle, a planned route of the vehicle, a weather condition, a road condition, a road geometry, a traffic condition, and/or a condition of exterior objects. Furthermore, in addition to or in combination with any one of the features of this and/or the preceding five paragraphs with respect to apparatus 600, the interior object data associated with the object may include a unique object identifier, a position of the object within the interior environment, a size of the object, a weight of the object, an orientation of the object within the interior environment, a shape of the object, an outline of the object, a classification of the object, a safety-related attribute of the object, and/or a restraint status of the object.

Figure 7:
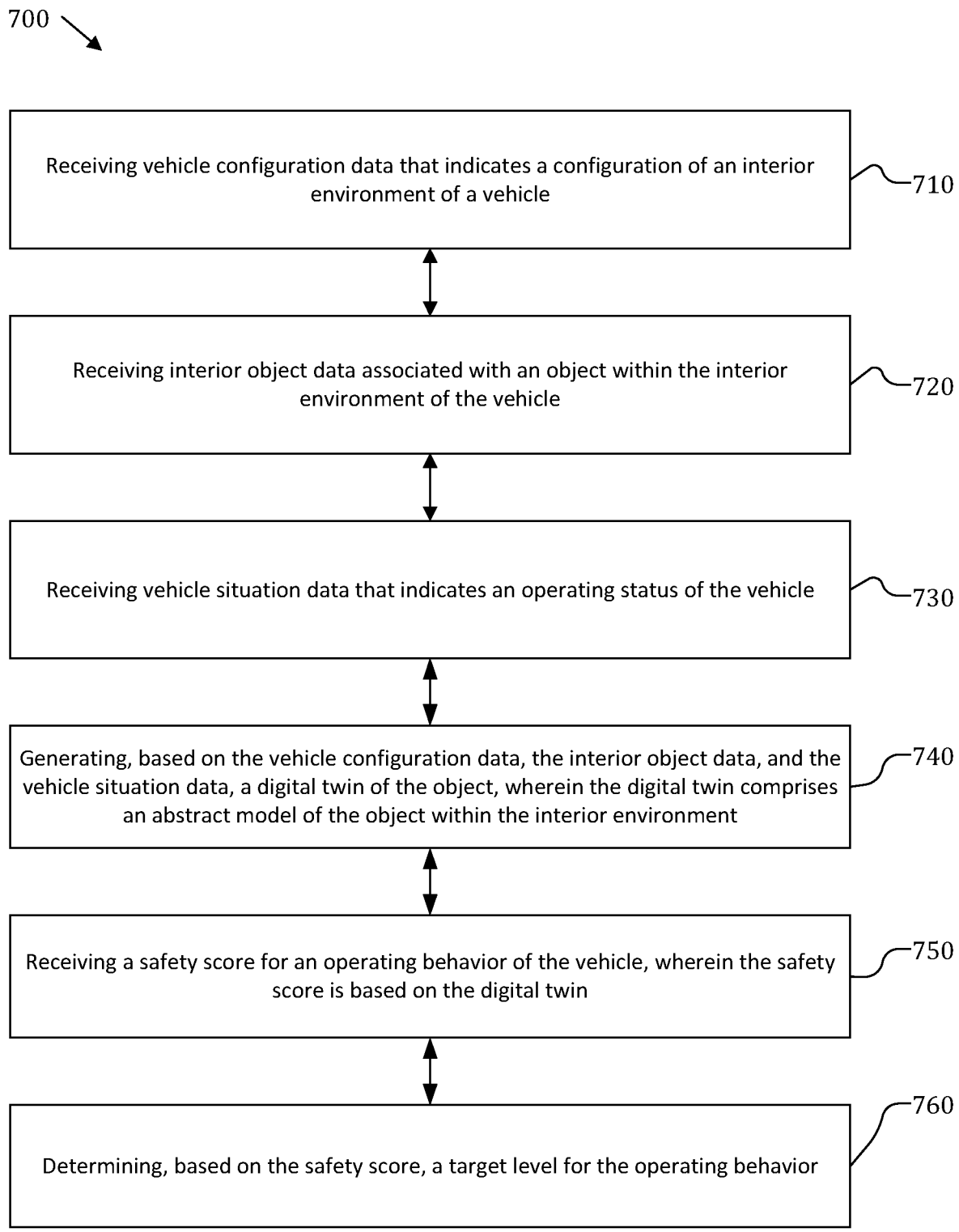
FIG. 7 depicts a schematic flow diagram of a method for a safety system for the in-vehicle safety of internal object(s).

FIG. 7 depicts a schematic flow diagram of a method 700 for monitoring and controlling the in-vehicle safety of internal objects of a vehicle using a digital twin. Method 700 may implement any of the safety system features described above with respect to, as examples, the safety system 100 of FIG. 1, safety system 200 of FIG. 2, safety scoring module 300 of FIG. 3, safety system 400 of FIG. 4, and/or safety system 500 of FIG. 5.

Method 700 includes, in 710, vehicle configuration data that indicates a configuration of an interior environment of a vehicle. Method 700 also includes, in 720, receiving interior object data associated with an object within the interior environment of the vehicle. Method 700 also includes, in 730, receiving vehicle situation data that indicates an operating status of the vehicle. Method 700 also includes, in 740, generating, based on the vehicle configuration data, the interior object data, and the vehicle situation data, a digital twin of the object, wherein the digital twin comprises an abstract model of the object within the interior environment. Method 700 also includes, in 750, receiving a safety score for an operating behavior of the vehicle, wherein the safety score is based on the digital twin. Method 700 also includes, in 760, determining, based on the safety score, a target level for the operating behavior.

In the following, various examples are provided that may include one or more aspects described above with reference to an apparatus for safety system (e.g., the safety system 100 of FIG. 1, safety system 200 of FIG. 2, safety scoring module 300 of FIG. 3, safety system 400 of FIG. 4, and/or safety system 500 of FIG. 5. The examples provided in relation to the apparatus may apply also to the described method(s), and vice versa.

Example 1 is an apparatus including a processor configured to receive vehicle configuration data that indicates a configuration of an interior environment of a vehicle. The processor is also configured to receive interior object data associated with an object within the interior environment of the vehicle. The processor is also configured to receive vehicle situation data that indicates an operating status of the vehicle. The processor is also configured to generate, based on the vehicle configuration data, the interior object data, and the vehicle situation data, a digital twin of the object, wherein the digital twin includes an abstract model of the object within the interior environment. The processor is also configured to receive a safety score for an operating behavior of the vehicle, wherein the safety score is based on the digital twin. The processor is also configured to determine, based on the safety score, a target level for the operating behavior.

Example 2 is the apparatus of example 1, wherein the operating behavior includes an acceleration of the vehicle, a jerk of the vehicle, a speed of the vehicle, and/or a trajectory of the vehicle.

Example 3 is the apparatus of either of examples 1 or 2, wherein the processor is further configured to generate an instruction configured to conform operation of the vehicle to the target level for the operating behavior.

Example 4 is the apparatus of any one of examples 1 to 3, wherein the processor is further configured to generate a warning message if a current operating level for the operating behavior exceeds the target level.

Example 5 is the apparatus of any one of examples 1 to 4, wherein the processor is further configured to transmit the digital twin to a safety scoring generator, wherein the processor configured to receive the safety score includes the processor configured to receive the safety score from the safety scoring generator.

Example 6 is the apparatus of any one of examples 1 to 5, wherein the processor is further configured to transmit a subset of the digital twin to a safety scoring generator, wherein the subset includes data changes to the digital twin that are different from a previously-transmitted digital twin of the object.

Example 7 is the apparatus of either of examples 5 or 6, the apparatus further including a transmitter, wherein the processor configured to transmit the digital twin to the safety scoring generator includes the processor configured to transmit via the transmitter the digital twin to the safety scoring generator.

Example 8 is the apparatus of any one of examples 5 to 7, the apparatus further including a receiver, wherein the processor configured to receive the safety score from the safety scoring generator includes the processor configured to receive via the receiver the safety score from the safety scoring generator.

Example 9 is the apparatus of either of examples 7 or 8, wherein the transmitter includes a wireless transmitter.

Example 10 is the apparatus of either of examples 8 or 9, wherein the receiver includes a wireless receiver.

Example 11 is the apparatus of any one of examples 5 to 10, wherein the safety scoring generator is located on a server that is remote from the vehicle.

Example 12 is the apparatus of any one of examples 7 to 11, wherein the transmitter is further configured to transmit the digital twin in a digital twin data message, wherein the digital twin data message includes a timestamp indicating a time at which the digital twin was created and/or last updated, the vehicle configuration data, the interior object data, and/or the vehicle situation data.

Example 13 is the apparatus of any one of examples 1 to 12, wherein the processor is further configured to generate a comfort message related to a status of the object in the vehicle.

Example 14 is the apparatus of any one of examples 1 to 13, wherein the processor is further configured to identify the object from the interior object data.

Example 15 is the apparatus of any one of examples 1 to 14, the apparatus further including a sensor configured to collect the interior object data, wherein the sensor includes a camera, a LiDAR, or a radar directed to the interior environment of the vehicle.

Example 16 is the apparatus of any one of examples 1 to 15, wherein the safety score includes a plurality of safety scores, wherein each safety score of the plurality of safety scores is based on the digital twin and is for a respective operating range of a plurality of operating ranges of the operating behavior.

Example 17 is the apparatus of any one of examples 1 to 16, wherein the safety score is based on a probability that the vehicle will be operated at the target level of the operating behavior.

Example 18 is the apparatus of any one of examples 1 to 17, wherein the safety score is based on a magnitude of a safety impact associated with operating the vehicle at the target level of the operating behavior.

Example 19 is the apparatus of any one of examples 1 to 18, wherein the safety scoring generator includes a lookup table containing a plurality of previously calculated safety scores for the digital twin, wherein each previously calculated safety score is associated with a previous configuration of the interior environment of the vehicle and a previous operating status of the vehicle, wherein the safety scoring generator is configured to select from the lookup table the safety score from the plurality of previously calculated safety scores based on matching the configuration to the previous configuration and matching the operating status to the previous operating status.

Example 20 is the apparatus of any one of examples 1 to 19, wherein the safety score is based on a scoring model of scoring data from a plurality of digital twins associated with other vehicles.

Example 21 is the apparatus of any one of examples 1 to 20, wherein the safety score is based on a scoring model of simulated scoring data.

Example 22 is the apparatus of any one of examples 1 to 21, wherein the object includes a moveable object that is repositionable within the interior of the vehicle.

Example 23 is the apparatus of example 22, wherein the moveable object includes a driver, a passenger, an animal, a bag, a purse, a backpack, and/or a suitcase.

Example 24 is the apparatus of any one of examples 1 to 23, wherein the vehicle configuration data includes a unique vehicle identifier, a vehicle model, a vehicle type, a vehicle variant, a seat configuration of the vehicle, a luggage rack configuration of the vehicle, and/or a cargo area configuration of the vehicle.

Example 25 is the apparatus of any one of examples 1 to 24, wherein the vehicle situation data includes a vehicle pose, a geographical location of the vehicle, a map location in relation to the geographical location, a speed of the vehicle, an acceleration of the vehicle, a target speed of the vehicle, a planned route of the vehicle, a weather condition, a road condition, a road geometry, a traffic condition, and/or a condition of exterior objects.

Example 26 is the apparatus of any one of examples 1 to 25, wherein the interior object data associated with the object includes a unique object identifier, a position of the object within the interior environment, a size of the object, a weight of the object, an orientation of the object within the interior environment, a shape of the object, an outline of the object, a classification of the object, a safety-related attribute of the object, and/or a restraint status of the object.

Example 27 is a safety system for monitoring the in-vehicle safety of an internal object of a vehicle, the system including a processor configured to receive vehicle configuration data that indicates a configuration of an interior environment of a vehicle. The processor is also configured to receive interior object data associated with an object within the interior environment of the vehicle. The processor is also configured to receive vehicle situation data that indicates an operating status of the vehicle. The processor is also configured to generate, based on the vehicle configuration data, the interior object data, and the vehicle situation data, a digital twin of the object, wherein the digital twin includes an abstract model of the object within the interior environment. The processor is also configured to receive a safety score for an operating behavior of the vehicle, wherein the safety score is based on the digital twin. The processor is also configured to determine, based on the safety score, a target level for the operating behavior.

Example 28 is the safety system of example 27, wherein the operating behavior includes an acceleration of the vehicle, a jerk of the vehicle, a speed of the vehicle, and/or a trajectory of the vehicle.

Example 29 is the safety system of either of examples 27 or 28, wherein the processor is further configured to generate an instruction configured to conform operation of the vehicle to the target level for the operating behavior.

Example 30 is the safety system of any one of examples 27 to 29, wherein the processor is further configured to generate a warning message if a current operating level for the operating behavior exceeds the target level.

Example 31 is the safety system of any one of examples 27 to 30, wherein the processor is further configured to transmit the digital twin to a safety scoring generator, wherein the processor configured to receive the safety score includes the processor configured to receive the safety score from the safety scoring generator.

Example 32 is the safety system of any one of examples 27 to 31, wherein the processor is further configured to transmit a subset of the digital twin to a safety scoring generator, wherein the subset includes data changes to the digital twin that are different from a previously-transmitted digital twin of the object.

Example 33 is the safety system of either of examples 31 or 32, the safety system further including a transmitter, wherein the processor configured to transmit the digital twin to the safety scoring generator includes the processor configured to transmit via the transmitter the digital twin to the safety scoring generator.

Example 34 is the safety system of any one of examples 31 to 33, the safety system further including a receiver, wherein the processor configured to receive the safety score from the safety scoring generator includes the processor configured to receive via the receiver the safety score from the safety scoring generator.

Example 35 is the safety system of examples 33 or 34, wherein the transmitter includes a wireless transmitter.

Example 36 is the safety system of either of examples 34 or 35, wherein the receiver includes a wireless receiver.

Example 37 is the safety system of any one of examples 31 to 36, wherein the safety scoring generator is located on a server that is remote from the vehicle.

Example 38 is the safety system of any one of examples 33 to 37, wherein the transmitter is further configured to transmit the digital twin in a digital twin data message, wherein the digital twin data message includes a timestamp indicating a time at which the digital twin was created and/or last updated, the vehicle configuration data, the interior object data, and/or the vehicle situation data.

Example 39 is the safety system of any one of examples 27 to 38, wherein the processor is further configured to generate a comfort message related to a status of the object in the vehicle.

Example 40 is the safety system of any one of examples 27 to 39, wherein the processor is further configured to identify the object from the interior object data.

Example 41 is the safety system of any one of examples 27 to 40, the safety system further including a sensor configured to collect the interior object data, wherein the sensor includes a camera, a LiDAR, or a radar directed to the interior environment of the vehicle.

Example 42 is the safety system of any one of examples 27 to 41, wherein the safety score includes a plurality of safety scores, wherein each safety score of the plurality of safety scores is based on the digital twin and is for a respective operating range of a plurality of operating ranges of the operating behavior.

Example 43 is the safety system of any one of examples 27 to 42, wherein the safety score is based on a probability that the vehicle will be operated at the target level of the operating behavior.

Example 44 is the safety system of any one of examples 27 to 43, wherein the safety score is based on a magnitude of a safety impact associated with operating the vehicle at the target level of the operating behavior.

Example 45 is the safety system of any one of examples 27 to 44, wherein the safety scoring generator includes a lookup table containing a plurality of previously calculated safety scores for the digital twin, wherein each previously calculated safety score is associated with a previous configuration of the interior environment of the vehicle and a previous operating status of the vehicle, wherein the safety scoring generator is configured to select from the lookup table the safety score from the plurality of previously calculated safety scores based on matching the configuration to the previous configuration and matching the operating status to the previous operating status.

Example 46 is the safety system of any one of examples 27 to 45, wherein the safety score is based on a scoring model of scoring data from a plurality of digital twins associated with other vehicles.

Example 47 is the safety system of any one of examples 27 to 46, wherein the safety score is based on a scoring model of simulated scoring data.

Example 48 is the safety system of any one of examples 27 to 47, wherein the object includes a moveable object that is repositionable within the interior of the vehicle.

Example 49 is the safety system of example 48, wherein the moveable object includes a driver, a passenger, an animal, a bag, a purse, a backpack, and/or a suitcase.

Example 50 is the safety system of any one of examples 27 to 49, wherein the vehicle configuration data includes a unique vehicle identifier, a vehicle model, a vehicle type, a vehicle variant, a seat configuration of the vehicle, a luggage rack configuration of the vehicle, and/or a cargo area configuration of the vehicle.

Example 51 is the safety system of any one of examples 27 to 50, wherein the vehicle situation data includes a vehicle pose, a geographical location of the vehicle, a map location in relation to the geographical location, a speed of the vehicle, an acceleration of the vehicle, a target speed of the vehicle, a planned route of the vehicle, a weather condition, a road condition, a road geometry, a traffic condition, and/or a condition of exterior objects.

Example 52 is the safety system of any one of examples 27 to 51, wherein the interior object data associated with the object includes a unique object identifier, a position of the object within the interior environment, a size of the object, a weight of the object, an orientation of the object within the interior environment, a shape of the object, an outline of the object, a classification of the object, a safety-related attribute of the object, and/or a restraint status of the object.

Example 53 is a device including a receiving means for receiving vehicle configuration data that indicates a configuration of an interior environment of a vehicle. The device also includes a receiving means for receiving interior object data associated with an object within the interior environment of the vehicle. The device also includes a receiving means for receiving vehicle situation data that indicates an operating status of the vehicle. The device also includes a generating means for generating, based on the vehicle configuration data, the interior object data, and the vehicle situation data, a digital twin of the object, wherein the digital twin includes an abstract model of the object within the interior environment. The device also includes a receiving means for receiving a safety score for an operating behavior of the vehicle, wherein the safety score is based on the digital twin. The device also includes a determining means for determining, based on the safety score, a target level for the operating behavior.

Example 54 is the device of example 53, wherein the operating behavior includes an acceleration of the vehicle, a jerk of the vehicle, a speed of the vehicle, and/or a trajectory of the vehicle.

Example 55 is the device of either of examples 53 or 54, wherein the device further includes a generating means for generating an instruction configured to conform operation of the vehicle to the target level for the operating behavior.

Example 56 is the device of any one of examples 53 to 55, wherein the device further includes a generating means for generating a warning message if a current operating level for the operating behavior exceeds the target level.

Example 57 is the device of any one of examples 53 to 56, wherein the device further includes a transmitting means for transmitting the digital twin to a safety scoring generator, wherein the receiving means is configured to receive the safety score from the safety scoring generator.

Example 58 is the device of example 57, wherein the transmitting means is configured to transmit a subset of the digital twin to a safety scoring generator, wherein the subset includes data changes to the digital twin that are different from a previously-transmitted digital twin of the object.

Example 59 is the device of either of examples 57 or 58, wherein the receiving means is configured to receive the safety score from the safety scoring generator.

Example 60 is the device of either of examples 57 or 59, wherein the transmitting means includes a wireless transmitting means for transmitting wireless communications.

Example 61 is the device of either of examples 53 to 60, wherein the receiving means includes a wireless receiving means for receiving wireless communications.

Example 62 is the device of any one of examples 56 to 61, wherein the safety scoring generator is located on a server that is remote from the vehicle.

Example 63 is the device of any one of examples 56 to 62, wherein the transmitting means is configured to transmit the digital twin in a digital twin data message, wherein the digital twin data message includes a timestamp indicating a time at which the digital twin was created and/or last updated, the vehicle configuration data, the interior object data, and/or the vehicle situation data.

Example 64 is the device of any one of examples 53 to 63, wherein the device further includes a generating means for generating a comfort message related to a status of the object in the vehicle.

Example 65 is the device of any one of examples 53 to 64, wherein the device further includes an identifying means for identifying the object from the interior object data.

Example 66 is the device of any one of examples 53 to 65, wherein the device further includes a sensing means for sensing configured to collect the interior object data, wherein the sensing means includes a camera, a LiDAR, or a radar directed to the interior environment of the vehicle.

Example 67 is the device of any one of examples 53 to 66, wherein the safety score includes a plurality of safety scores, wherein each safety score of the plurality of safety scores is based on the digital twin and is for a respective operating range of a plurality of operating ranges of the operating behavior.

Example 68 is the device of any one of examples 53 to 67, wherein the safety score is based on a probability that the vehicle will be operated at the target level of the operating behavior.

Example 69 is the device of any one of examples 53 to 68, wherein the safety score is based on a magnitude of a safety impact associated with operating the vehicle at the target level of the operating behavior.

Example 70 is the device of any one of examples 53 to 69, wherein the safety scoring generator includes a storing means for storing a plurality of previously calculated safety scores for the digital twin, wherein each previously calculated safety score is associated with a previous configuration of the interior environment of the vehicle and a previous operating status of the vehicle, wherein the safety scoring generator is configured to select from the storing means the safety score from the plurality of previously calculated safety scores based on matching the configuration to the previous configuration and matching the operating status to the previous operating status.

Example 71 is the device of any one of examples 53 to 70, wherein the safety score is based on a scoring model of scoring data from a plurality of digital twins associated with other vehicles.

Example 72 is the device of any one of examples 53 to 71, wherein the safety score is based on a scoring model of simulated scoring data.

Example 73 is the device of any one of examples 53 to 72, wherein the object includes a moveable object that is repositionable within the interior of the vehicle.

Example 74 is the device of example 73, wherein the moveable object includes a driver, a passenger, an animal, a bag, a purse, a backpack, and/or a suitcase.

Example 75 is the device of any one of examples 53 to 74, wherein the vehicle configuration data includes a unique vehicle identifier, a vehicle model, a vehicle type, a vehicle variant, a seat configuration of the vehicle, a luggage rack configuration of the vehicle, and/or a cargo area configuration of the vehicle.

Example 76 is the device of any one of examples 53 to 75, wherein the vehicle situation data includes a vehicle pose, a geographical location of the vehicle, a map location in relation to the geographical location, a speed of the vehicle, an acceleration of the vehicle, a target speed of the vehicle, a planned route of the vehicle, a weather condition, a road condition, a road geometry, a traffic condition, and/or a condition of exterior objects.

Example 77 is the device of any one of examples 53 to 76, wherein the interior object data associated with the object includes a unique object identifier, a position of the object within the interior environment, a size of the object, a weight of the object, an orientation of the object within the interior environment, a shape of the object, an outline of the object, a classification of the object, a safety-related attribute of the object, and/or a restraint status of the object.

Example 78 a non-transitory computer readable medium, including instructions which, if executed, cause a processor to receive vehicle configuration data that indicates a configuration of an interior environment of a vehicle. The instructions also cause the processor to receive interior object data associated with an object within the interior environment of the vehicle. The instructions also cause the processor to receive vehicle situation data that indicates an operating status of the vehicle. The instructions also cause the processor to generate, based on the vehicle configuration data, the interior object data, and the vehicle situation data, a digital twin of the object, wherein the digital twin includes an abstract model of the object within the interior environment. The instructions also cause the processor to receive a safety score for an operating behavior of the vehicle, wherein the safety score is based on the digital twin. The instructions also cause the processor to determine, based on the safety score, a target level for the operating behavior.

Example 79 is the non-transitory computer readable medium of example 78, wherein the operating behavior includes an acceleration of the vehicle, a jerk of the vehicle, a speed of the vehicle, and/or a trajectory of the vehicle.

Example 80 is the non-transitory computer readable medium of either of examples 78 or 79, wherein the instructions also cause the processor to generate an instruction configured to conform operation of the vehicle to the target level for the operating behavior.

Example 81 is the non-transitory computer readable medium of any one of examples 78 to 80, wherein the instructions also cause the processor to generate a warning message if a current operating level for the operating behavior exceeds the target level.

Example 82 is the non-transitory computer readable medium of any one of examples 78 to 81, wherein the instructions also cause the processor to transmit the digital twin to a safety scoring generator, wherein the instructions that cause the processor to receive the safety score include instructions that cause the processor to receive the safety score from the safety scoring generator.

Example 83 is the non-transitory computer readable medium of any one of examples 78 to 82, wherein the instructions also cause the processor to transmit a subset of the digital twin to a safety scoring generator, wherein the subset includes data changes to the digital twin that are different from a previously-transmitted digital twin of the object.

Example 84 is the non-transitory computer readable medium of either of examples 82 or 83, wherein the instructions that cause the processor to transmit the digital twin to the safety scoring generator include instructions that cause a transmitter to transmit the digital twin to the safety scoring generator.

Example 85 is the non-transitory computer readable medium of any one of examples 82 to 84, wherein the instructions that cause the processor to receive the safety score from the safety scoring generator include instructions that cause a receiver to receive the safety score from the safety scoring generator.

Example 86 is the non-transitory computer readable medium of either of examples 84 or 85, wherein the transmitter includes a wireless transmitter.

Example 87 is the non-transitory computer readable medium of either of examples 85 or 86, wherein the receiver includes a wireless receiver.

Example 88 is the non-transitory computer readable medium of any one of examples 82 to 87, wherein the safety scoring generator is located on a server that is remote from the vehicle.

Example 89 is the non-transitory computer readable medium of any one of examples 84 to 88, wherein the instructions also cause the transmitter to transmit the digital twin in a digital twin data message, wherein the digital twin data message includes a timestamp indicating a time at which the digital twin was created and/or last updated, the vehicle configuration data, the interior object data, and/or the vehicle situation data.

Example 90 is the non-transitory computer readable medium of any one of examples 78 to 89, wherein the instructions also cause the processor to generate a comfort message related to a status of the object in the vehicle.

Example 91 is the non-transitory computer readable medium of any one of examples 78 to 90, wherein the instructions also cause the processor to identify the object from the interior object data.

Example 92 is the non-transitory computer readable medium of any one of examples 78 to 91, wherein the instructions also cause a sensor to collect the interior object data, wherein the sensor includes a camera, a LiDAR, or a radar directed to the interior environment of the vehicle.

Example 93 is the non-transitory computer readable medium of any one of examples 78 to 92, wherein the safety score includes a plurality of safety scores, wherein each safety score of the plurality of safety scores is based on the digital twin and is for a respective operating range of a plurality of operating ranges of the operating behavior.

Example 94 is the non-transitory computer readable medium of any one of examples 78 to 93, wherein the safety score is based on a probability that the vehicle will be operated at the target level of the operating behavior.

Example 95 is the non-transitory computer readable medium of any one of examples 78 to 94, wherein the safety score is based on a magnitude of a safety impact associated with operating the vehicle at the target level of the operating behavior.

Example 96 is the non-transitory computer readable medium of any one of examples 78 to 95, wherein the safety scoring generator includes a lookup table containing a plurality of previously calculated safety scores for the digital twin, wherein each previously calculated safety score is associated with a previous configuration of the interior environment of the vehicle and a previous operating status of the vehicle, wherein the safety scoring generator is configured to select from the lookup table the safety score from the plurality of previously calculated safety scores based on matching the configuration to the previous configuration and matching the operating status to the previous operating status.

Example 97 is the non-transitory computer readable medium of any one of examples 78 to 96, wherein the safety score is based on a scoring model of scoring data from a plurality of digital twins associated with other vehicles.

Example 98 is the non-transitory computer readable medium of any one of examples 78 to 97, wherein the safety score is based on a scoring model of simulated scoring data.

Example 99 is the non-transitory computer readable medium of any one of examples 78 to 98, wherein the object includes a moveable object that is repositionable within the interior of the vehicle.

Example 100 is the non-transitory computer readable medium of example 99, wherein the moveable object includes a driver, a passenger, an animal, a bag, a purse, a backpack, and/or a suitcase.

Example 101 is the non-transitory computer readable medium of any one of examples 78 to 100, wherein the vehicle configuration data includes a unique vehicle identifier, a vehicle model, a vehicle type, a vehicle variant, a seat configuration of the vehicle, a luggage rack configuration of the vehicle, and/or a cargo area configuration of the vehicle.

Example 102 is the non-transitory computer readable medium of any one of examples 78 to 101, wherein the vehicle situation data includes a vehicle pose, a geographical location of the vehicle, a map location in relation to the geographical location, a speed of the vehicle, an acceleration of the vehicle, a target speed of the vehicle, a planned route of the vehicle, a weather condition, a road condition, a road geometry, a traffic condition, and/or a condition of exterior objects.

Example 103 is the non-transitory computer readable medium of any one of examples 78 to 102, wherein the interior object data associated with the object includes a unique object identifier, a position of the object within the interior environment, a size of the object, a weight of the object, an orientation of the object within the interior environment, a shape of the object, an outline of the object, a classification of the object, a safety-related attribute of the object, and/or a restraint status of the object.

Example 104 is a method for monitoring the in-vehicle safety of an internal object of a vehicle, wherein the method includes receiving vehicle configuration data that indicates a configuration of an interior environment of a vehicle. The method also includes receiving interior object data associated with an object within the interior environment of the vehicle. The method also includes receiving vehicle situation data that indicates an operating status of the vehicle. The method also includes generating, based on the vehicle configuration data, the interior object data, and the vehicle situation data, a digital twin of the object, wherein the digital twin includes an abstract model of the object within the interior environment. The method also includes receiving a safety score for an operating behavior of the vehicle, wherein the safety score is based on the digital twin. The method also includes determining, based on the safety score, a target level for the operating behavior.

Example 105 is the method of example 104, wherein the operating behavior includes an acceleration of the vehicle, a jerk of the vehicle, a speed of the vehicle, and/or a trajectory of the vehicle.

Example 106 is the method of either of examples 104 or 105, the method further including generating an instruction configured to conform operation of the vehicle to the target level for the operating behavior.

Example 107 is the method of any one of examples 104 to 106, the method further including generating a warning message if a current operating level for the operating behavior exceeds the target level.

Example 108 is the method of any one of examples 104 to 107, the method further including transmitting the digital twin to a safety scoring generator, wherein receiving the safety score includes receiving the safety score from the safety scoring generator.

Example 109 is the method of any one of examples 104 to 108, the method further including transmitting a subset of the digital twin to a safety scoring generator, wherein the subset includes data changes to the digital twin that are different from a previously-transmitted digital twin of the object.

Example 110 is the method of either of examples 108 or 109, wherein transmitting the digital twin to the safety scoring generator includes transmitting via a transmitter the digital twin to the safety scoring generator.

Example 111 is the method of any one of examples 108 to 110, wherein receiving the safety score from the safety scoring generator includes receiving via a receiver the safety score from the safety scoring generator.

Example 112 is the method of either of examples 110 or 111, wherein the transmitter includes a wireless transmitter.

Example 113 is the method of either of examples 111 or 112, wherein the receiver includes a wireless receiver.

Example 114 is the method of any one of examples 108 to 113, wherein the safety scoring generator is located on a server that is remote from the vehicle.

Example 115 is the method of any one of examples 110 to 114, wherein transmitting the digital twin includes transmitting the digital twin in a digital twin data message, wherein the digital twin data message includes a timestamp indicating a time at which the digital twin was created and/or last updated, the vehicle configuration data, the interior object data, and/or the vehicle situation data.

Example 116 is the method of any one of examples 104 to 115, the method further including generating a comfort message related to a status of the object in the vehicle.

Example 117 is the method of any one of examples 104 to 116, the method further including identifying the object from the interior object data.

Example 118 is the method of any one of examples 104 to 117, the method further including collecting the interior object data via a sensor, wherein the sensor includes a camera, a LiDAR, or a radar directed to the interior environment of the vehicle.

Example 119 is the method of any one of examples 104 to 118, wherein the safety score includes a plurality of safety scores, wherein each safety score of the plurality of safety scores is based on the digital twin and is for a respective operating range of a plurality of operating ranges of the operating behavior.

Example 120 is the method of any one of examples 104 to 119, wherein the safety score is based on a probability that the vehicle will be operated at the target level of the operating behavior.

Example 121 is the method of any one of examples 104 to 120, wherein the safety score is based on a magnitude of a safety impact associated with operating the vehicle at the target level of the operating behavior.

Example 122 is the method of any one of examples 104 to 121, wherein the safety scoring generator includes a lookup table containing a plurality of previously calculated safety scores for the digital twin, wherein each previously calculated safety score is associated with a previous configuration of the interior environment of the vehicle and a previous operating status of the vehicle, wherein the safety scoring generator is configured to select from the lookup table the safety score from the plurality of previously calculated safety scores based on matching the configuration to the previous configuration and matching the operating status to the previous operating status.

Example 123 is the method of any one of examples 104 to 122, wherein the safety score is based on a scoring model of scoring data from a plurality of digital twins associated with other vehicles.

Example 124 is the method of any one of examples 104 to 123, wherein the safety score is based on a scoring model of simulated scoring data.

Example 125 is the method of any one of examples 104 to 124, wherein the object includes a moveable object that is repositionable within the interior of the vehicle.

Example 126 is the method of example 125, wherein the moveable object includes a driver, a passenger, an animal, a bag, a purse, a backpack, and/or a suitcase.

Example 127 is the method of any one of examples 104 to 126, wherein the vehicle configuration data includes a unique vehicle identifier, a vehicle model, a vehicle type, a vehicle variant, a seat configuration of the vehicle, a luggage rack configuration of the vehicle, and/or a cargo area configuration of the vehicle.

Example 128 is the method of any one of examples 104 to 127, wherein the vehicle situation data includes a vehicle pose, a geographical location of the vehicle, a map location in relation to the geographical location, a speed of the vehicle, an acceleration of the vehicle, a target speed of the vehicle, a planned route of the vehicle, a weather condition, a road condition, a road geometry, a traffic condition, and/or a condition of exterior objects.

Example 129 is the method of any one of examples 104 to 128, wherein the interior object data associated with the object includes a unique object identifier, a position of the object within the interior environment, a size of the object, a weight of the object, an orientation of the object within the interior environment, a shape of the object, an outline of the object, a classification of the object, a safety-related attribute of the object, and/or a restraint status of the object.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. An apparatus comprising:
 a processor configured to:
 receive vehicle configuration data that indicates a configuration of an interior environment of a vehicle;
 receive interior object data associated with an object within the interior environment of the vehicle;
 receive vehicle situation data that indicates an operating status of the vehicle;
 generate, based on the vehicle configuration data, the interior object data, and the vehicle situation data, a digital twin of the object, wherein the digital twin comprises an abstract model of the object within the interior environment;
 determine a set of data differences between the digital twin and a previously-transmitted version of the digital twin;
 transmit the set of data differences to a safety scoring generator that determines a safety score for an operating behavior of the vehicle, wherein the safety score is based on the previously-transmitted version of the digital twin and the set of data differences;
receive the safety score from the safety scoring generator;
determine, based on the safety score, a target level for the operating behavior; and
generate an instruction configured to conform operation of the vehicle to the target level for the operating behavior.

2. The apparatus of claim 1, wherein the operating behavior comprises an acceleration of the vehicle, a jerk of the vehicle, a speed of the vehicle, and/or a trajectory of the vehicle.

3. The apparatus of claim 1, wherein the processor is further configured to generate a warning message if a current operating level for the operating behavior exceeds the target level.

4. The apparatus of claim 1, wherein the processor configured to receive the safety score comprises the processor configured to receive the safety score from the safety scoring generator.

5. The apparatus of claim 1, wherein the safety scoring generator is located on a server that is remote from the vehicle.

6. The apparatus of claim 1, wherein the processor is further configured to identify the object from the interior object data.

7. The apparatus of claim 1, the apparatus further comprising a sensor configured to collect the interior object data, wherein the sensor comprises a camera, a LiDAR, or a radar directed to the interior environment of the vehicle.

8. The apparatus of claim 1, wherein the safety score comprises a plurality of safety scores, wherein each safety score of the plurality of safety scores is based on the digital twin and is for a respective operating range of a plurality of operating ranges of the operating behavior.

9. The apparatus of claim 1, wherein the safety score is based on a probability that the vehicle will be operated at the target level of the operating behavior.

10. The apparatus of claim 1, wherein the safety score is based on a magnitude of a safety impact associated with operating the vehicle at the target level of the operating behavior.

11. The apparatus of claim 1, wherein the safety scoring generator comprises a lookup table containing a plurality of previously calculated safety scores for the digital twin, wherein each previously calculated safety score is associated with a previous configuration of the interior environment of the vehicle and a previous operating status of the vehicle, wherein the safety scoring generator is configured to select from the lookup table the safety score from the plurality of previously calculated safety scores based on matching the configuration to the previous configuration and matching the operating status to the previous operating status.

12. The apparatus of claim 1, wherein the safety score is based on a scoring model of scoring data from a plurality of digital twins associated with other vehicles.

13. The apparatus of claim 1, wherein the safety score is based on a scoring model of simulated scoring data.

14. The apparatus of claim 1, wherein the object comprises a driver, a passenger, an animal, a bag, a purse, a backpack, and/or a suitcase.

15. A non-transitory computer readable medium, comprising instructions which, if executed, cause a processor to:
receive vehicle configuration data that indicates a configuration of an interior environment of a vehicle;
receive interior object data associated with an object within the interior environment of the vehicle;
receive vehicle situation data that indicates an operating status of the vehicle;
generate, based on the vehicle configuration data, the interior object data, and the vehicle situation data, a digital twin of the object, wherein the digital twin comprises an abstract model of the object within the interior environment;
determine a set of data differences between the digital twin and a previously-transmitted version of the digital twin;
transmit the set of data differences to a safety scoring generator that determines a safety score for an operating behavior of the vehicle, wherein the safety score is based on the previously-transmitted version of the digital twin and the set of data differences;
receive the safety score from the safety scoring generator;
determine, based on the safety score, a target level for the operating behavior; and
generate an instruction configured to conform operation of the vehicle to the target level for the operating behavior.

16. The non-transitory computer readable medium of claim 15, wherein the vehicle configuration data comprises a unique vehicle identifier, a vehicle model, a vehicle type, a vehicle variant, a seat configuration of the vehicle, a luggage rack configuration of the vehicle, and/or a cargo area configuration of the vehicle.

17. The non-transitory computer readable medium of claim 15, wherein the vehicle situation data comprises a vehicle pose, a geographical location of the vehicle, a map location in relation to the geographical location, a speed of the vehicle, an acceleration of the vehicle, a target speed of the vehicle, a planned route of the vehicle, a weather condition, a road condition, a road geometry, a traffic condition, and/or a condition of exterior objects.

18. The non-transitory computer readable medium of claim 15, wherein the interior object data associated with the object comprises a unique object identifier, a position of the object within the interior environment, a size of the object, a weight of the object, an orientation of the object within the interior environment, a shape of the object, an outline of the object, a classification of the object, a safety-related attribute of the object, and/or a restraint status of the object.

* * * * *